(12) United States Patent
Sakurabu

(10) Patent No.: US 9,838,593 B2
(45) Date of Patent: Dec. 5, 2017

(54) FOCUSING CONTROL DEVICE, FOCUSING CONTROL METHOD, FOCUSING CONTROL PROGRAM, LENS DEVICE, AND IMAGING DEVICE

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/591,125

(22) Filed: May 10, 2017

(65) Prior Publication Data

US 2017/0244889 A1    Aug. 24, 2017

Related U.S. Application Data

(63) Continuation of application No. PCT/JP2015/080136, filed on Oct. 26, 2015.

(30) Foreign Application Priority Data

Nov. 18, 2014    (JP) .................................. 2014-233500

(51) Int. Cl.
     *H04N 5/232*      (2006.01)
     *G02B 7/09*      (2006.01)
     *G02B 7/28*      (2006.01)

(52) U.S. Cl.
     CPC ........... *H04N 5/23212* (2013.01); *G02B 7/09* (2013.01); *G02B 7/28* (2013.01)

(58) Field of Classification Search
     CPC .. H04N 5/23212; H04N 5/3696; H04N 5/351; G02B 7/09; G02B 7/28; G02B 7/34; G02B 7/346
     See application file for complete search history.

(56) References Cited

U.S. PATENT DOCUMENTS 6,085,041 A * 7/2000 Shiokama .............. G02B 7/102
                                                 396/75
2012/0133813 A1* 5/2012 Nagano ................ H04N 5/3696
                                                 348/311

(Continued)

FOREIGN PATENT DOCUMENTS

JP      H11-218672      8/1999
JP      2001-004910      1/2001

(Continued)

OTHER PUBLICATIONS

"Written Opinion of the International Searching Authority of PCT/JP2015/080136", dated Jan. 19, 2016, with English translation thereof, pp. 1-6.

(Continued)

*Primary Examiner* — Albert Cutler
(74) *Attorney, Agent, or Firm* — JCIPRNET

(57) ABSTRACT

Disclosed are a focusing control device which performs focusing control by a phase difference AF method with high accuracy, a lens device, an imaging device, a focusing control method, and a non-transitory computer readable recording medium storing a program. A digital camera includes a phase difference calculation unit which calculates the phase difference between a signal group output from a plurality of pixels 52A and a signal group output from a plurality of pixels 52B, a lens drive control unit which drives a focus lens according to a drive amount corresponding to the phase difference, a phase difference prediction unit which, based on a coefficient for converting a phase difference calculated at an arbitrary time to a drive amount and the difference between a movement amount of the focus lens and the drive amount, calculates a predicted value of the phase difference.

30 Claims, 26 Drawing Sheets

(56) References Cited

U.S. PATENT DOCUMENTS

2013/0120644 A1* 5/2013 Fujii .................. G02B 7/36
348/349
2014/0334683 A1* 11/2014 Masuda ............. H04N 5/23212
382/103

FOREIGN PATENT DOCUMENTS

| JP | 2008-271006 | 11/2008 |
| JP | 2010-008507 | 1/2010 |
| JP | 2011-059384 | 3/2011 |
| JP | 2011-142464 | 7/2011 |

OTHER PUBLICATIONS

"International Search Report (Form PCT/ISA/210) of PCT/JP2015/080136", dated Jan. 19, 2016, with English translation thereof, pp. 1-3.
Written Opinion of the International Searching Authority (Form PCT/ISA/237) of PCT/JP2015/080136, dated Jan. 19, 2016, with English translation thereof, pp. 1-6.

* cited by examiner

FIG. 16
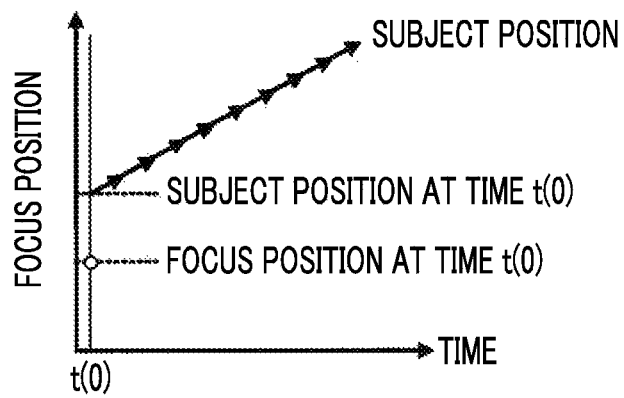
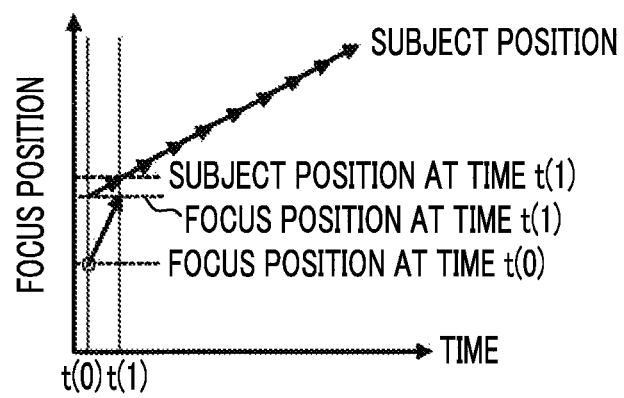
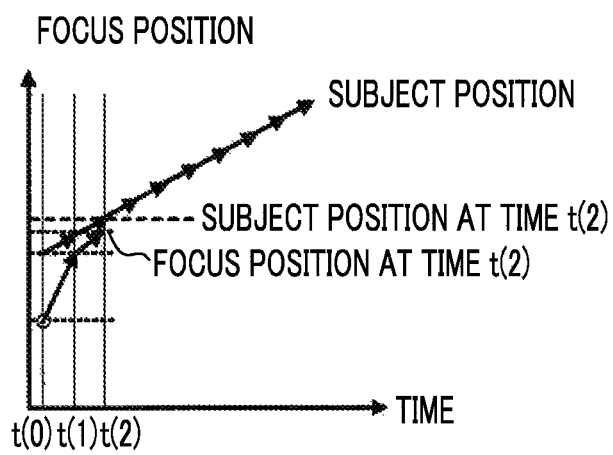

FOCUSING CONTROL DEVICE, FOCUSING CONTROL METHOD, FOCUSING CONTROL PROGRAM, LENS DEVICE, AND IMAGING DEVICE

CROSS-REFERENCE TO RELATED APPLICATIONS

This application is a Continuation of PCT International Application No. PCT/JP2015/080136 filed on Oct. 26, 2015, which claims priority under 35 U.S.C §119(a) to Japanese Patent Application No. 2014-233500 filed on Nov. 18, 2014. Each of the above application(s) is hereby expressly incorporated by reference, in its entirety, into the present application.

BACKGROUND OF THE INVENTION

1. Field of the Invention

The present invention relates to a focusing control device, a focusing control method, a non-transitory computer readable recording medium storing a focusing control program, a lens device, and an imaging device.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a mobile phone, such as a smartphone. The information devices having an imaging function described above are referred to as imaging devices.

In these imaging devices, as a focusing control method which focuses on a main subject, a contrast auto focus (AF) method or a phase difference AF method (for example, see JP2010-008507A, JP2011-059384A, and JP2001-004910A) is employed. Since the phase difference AF method can perform high-speed processing, the phase difference AF method is a method effective for moving image capturing where a subject is continuously imaged with an imaging element.

JP2010-008507A describes an imaging device which predicts a current focus lens position based on defocus amounts calculated by a phase difference detection method multiple times in the past.

JP2011-059384A describes an imaging device which calculates the amount of change of an image plane position using a prediction function based on the image plane position determined by a defocus amount detected during imaging and a position of an imaging lens, and a release time lag as a predetermined time, and calculates a target position of the image plane position.

JP2001-004910A describes an imaging device which detects a moving speed of a subject based on defocus amounts calculated by a phase difference detection method multiple times in the past.

SUMMARY OF THE INVENTION

In the phase difference AF method, correlation calculation of a pair of signal groups corresponding to different portions of a pupil area of an imaging lens is performed, a deviation amount between a pair of signal groups when a correlation value of a pair of signal groups calculated by the correlation calculation becomes minimum is determined as a phase difference, and a focus lens is driven based on the phase difference. However, in a case where contrast of the main subject is low, a case where the brightness of the main subject is low, a case where the phase difference is calculated during movement of the focus lens, or the like, there are a plurality of phase differences at which the correlation value of a pair of signal groups decreases, a correct phase difference is hardly determined. If an incorrect phase difference is determined, the focus lens does not reach a focusing position, and a phenomenon occurs in which the focus lens exceeds the focusing position, and there may be a case where the focus lens will never reach the focusing position.

The imaging devices described in JP2010-008507A, JP2011-059384A, and JP2001-004910A predict the focus lens position or the image plane position using the defocus amount determined based on the result of the correlation calculation, and a method for increasing the calculation accuracy of the phase difference is not disclosed.

The invention has been accomplished in consideration of the above-described situation, and an object of the invention is to provide a focusing control device capable of increasing calculation accuracy of a phase difference to perform drive of a focus lens by a phase difference AF method with high accuracy, a lens device and an imaging device including the focusing control device, a focusing control method, and a non-transitory computer readable recording medium storing a program.

The invention provides a focusing control device comprising a plurality of first signal detection units which receive one of a pair of luminous fluxes passing through different portions arranged in one direction of a pupil area of an imaging optical system including a focus lens and detect signals according to the amount of received light, a plurality of second signal detection units which receive the other luminous flux of the pair of luminous fluxes and detect signals according to the amount of received light, a phase difference calculation unit which, based on a result of correlation calculation of a first signal group output from the plurality of first signal detection units and a second signal group output from the plurality of second signal detection units, calculates a phase difference as a deviation amount between the first signal group and the second signal group in the one direction, a lens drive control unit which drives the focus lens according to a drive amount corresponding to a phase difference calculated by the phase difference calculation unit, a phase difference prediction unit which, based on a coefficient for converting, to a drive amount of the focus lens, a phase difference calculated by the phase difference calculation unit at a first time when the focus lens is at an arbitrary position and the difference between a movement amount of the focus lens from the arbitrary position at a second time after the focus lens starts to move according to a drive amount corresponding to the phase difference and the drive amount, calculates a predicted value of the phase difference at the second time, and a prediction error calculation unit which calculates a prediction error as an error between a phase difference calculated by the phase difference calculation unit at the second time and a predicted value calculated by the phase difference prediction unit. The lens drive control unit controls the drive of the focus lens based on a history of the prediction error.

The invention provides a focusing control device comprising a plurality of first signal detection units which receive one of a first pair of luminous fluxes passing through different portions arranged in one direction of a pupil area of an imaging optical system including a focus lens and detect signals according to the amount of received light, a plurality of second signal detection units which receive the other luminous flux of the first pair of luminous fluxes and detect signals according to the amount of received light, a plurality of third signal detection units which receive one of a second pair of luminous fluxes passing through different portions arranged in a direction orthogonal to the one direction of the pupil area and detect signals according to the amount of received light, a plurality of fourth signal detection units which receive the other luminous flux of the second pair of luminous fluxes and detect signals according to the amount of received light, a first phase difference calculation unit which, based on a result of correlation calculation of a first signal group output from the plurality of first signal detection units and a second signal group output from the plurality of second signal detection units, calculates a first phase difference as a deviation amount between the first signal group and the second signal group in the one direction, a second phase difference calculation unit which, based on a result of correlation calculation of a third signal group output from the plurality of third signal detection units and a fourth signal group output from the plurality of fourth signal detection units, calculates a second phase difference as a deviation amount between the third signal group and the fourth signal group in the direction orthogonal to the one direction, a lens drive control unit which drives the focus lens according to a drive amount corresponding to a phase difference calculated by the first phase difference calculation unit or the second phase difference calculation unit, a phase difference prediction unit which, based on a coefficient for converting, to a drive amount of the focus lens, a phase difference calculated by the first phase difference calculation unit or the second phase difference calculation unit at a first time when the focus lens is at an arbitrary position and the difference between a movement amount of the focus lens from the arbitrary position at a second time after the focus lens starts to move according to a drive amount corresponding to the phase difference and the drive amount, calculates a predicted value of the phase difference at the second time, and a prediction error calculation unit which calculates a first prediction error as the difference between a predicted value calculated by the phase difference prediction unit and a phase difference calculated by the first phase difference calculation unit at the second time and a second prediction error as the difference between a predicted value calculated by the phase difference prediction unit and a phase difference calculated by the second phase difference calculation unit at the second time. The lens drive control unit drives the focus lens with a drive amount corresponding to a phase difference calculated by the first phase difference calculation unit in a case where both of the first phase difference and the second phase difference are calculated and a cumulative value of the first prediction error is equal to or less than a cumulative value of the second prediction error, and drives the focus lens with a drive amount corresponding to a phase difference calculated by the second phase difference calculation unit in a case where both of the first phase difference and the second phase difference are calculated and the cumulative value of the first prediction error exceeds the cumulative value of the second prediction error.

The invention provides a lens device comprising the above-described focusing control device, and the above-described imaging optical system.

The invention provides an imaging device comprising the above-described focusing control device.

The invention provides a focusing control method which controls a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light. The focusing control method comprises a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction, a lens drive control step of driving the focus lens according to a drive amount corresponding to a phase difference calculated in the phase difference calculation step, a phase difference prediction step of, based on a coefficient for converting, to a drive amount of the focus lens, a phase difference calculated in the phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a prediction error as an error between a phase difference calculated in the phase difference calculation step at the second time and a predicted value calculated in the phase difference prediction step. In the lens drive control step, the drive of the focus lens is controlled based on a history of the prediction error.

The invention provides a focusing control method which controls a position of a focus lens using a plurality of first signal detection units configured to receive one of a first pair of luminous fluxes passing through different portions arranged in one direction of a pupil area of an imaging optical system including a focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light. The focusing control method comprises a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction, a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction, a lens drive control step of driving the focus lens according to a drive amount corresponding to a phase difference calculated by the first phase difference calculation step or the second phase difference calculation step, a phase difference prediction step of, based on a coefficient for converting, to a drive amount of the focus lens, a phase difference calculated in the first phase difference calculation step or the second phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a first prediction error as the difference between a predicted value calculated in the phase difference prediction step and a phase difference calculated in the first phase difference calculation step at the second time and a second prediction error as the difference between a predicted value calculated in the phase difference prediction step and a phase difference calculated in the second phase difference calculation step at the second time. In the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

The invention provides a non-transitory computer readable recording medium storing a focusing control program which causes a computer to control a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light. The non-transitory computer readable recording medium storing the focusing control program comprises a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction, a lens drive control step of driving the focus lens according to a drive amount corresponding to a phase difference calculated in the phase difference calculation step, a phase difference prediction step of, based on a coefficient for converting, to a drive amount of the focus lens, a phase difference calculated in the phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a prediction error as an error between a phase difference calculated in the phase difference calculation step at the second time and a predicted value calculated in the phase difference prediction step. In the lens drive control step, the drive of the focus lens is controlled based on a history of the prediction error.

The invention provides a non-transitory computer readable recording medium storing a focusing control program which causes a computer to control a position of a focus lens using a plurality of first signal detection units configured to receive one of a first pair of luminous fluxes passing through different portions arranged in one direction of a pupil area of an imaging optical system including the focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light. The non-transitory computer readable recording medium storing the focusing control program comprises a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction, a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction, a lens drive control step of driving the focus lens according to a drive amount corresponding to a phase difference calculated by the first phase difference calculation step or the second phase difference calculation step, a phase difference prediction step of, based on a coefficient for converting, to a drive amount of the focus lens, a phase difference calculated in the first phase difference calculation step or the second phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a first prediction error as the difference between a predicted value calculated in the phase difference prediction step and a phase difference calculated in the first phase difference calculation step at the second time and a second prediction error as the difference between a predicted value calculated in the phase difference prediction step and a phase difference calculated in the second phase difference calculation step at the second time. In the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

According to the invention, it is possible to provide a focusing control device, a lens device and an imaging device including the focusing control device, a focusing control method, and a non-transitory computer readable recording medium storing a program capable of increasing the calculation accuracy of a phase difference to perform the drive of a focus lens by a phase difference AF method with high accuracy.

BRIEF DESCRIPTION OF THE DRAWINGS

FIG. 16 is a diagram illustrating the relationship between a position of a focus lens in a case of continuously focusing on a moving subject and an actual focusing position (subject position).

DESCRIPTION OF THE PREFERRED EMBODIMENTS

Figure 1:
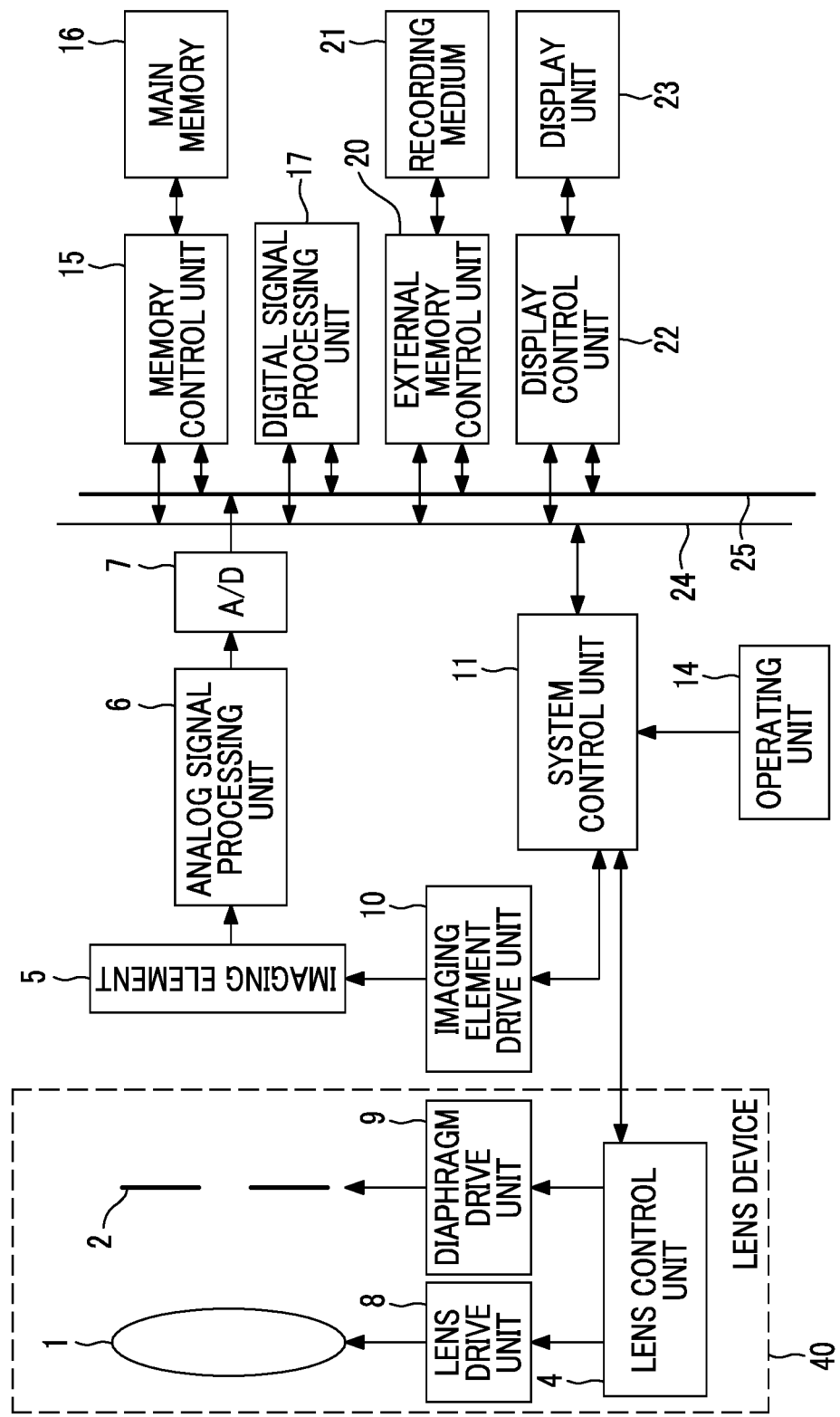
FIG. 1 is a diagram showing the schematic configuration of a digital camera as an example of an imaging device according to an embodiment of the invention.

Hereinafter, an embodiment of the invention will be described referring to the drawings.

FIG. 1 is a diagram showing the schematic configuration of a digital camera as an example of an imaging device according to an embodiment of the invention.

The digital camera shown in FIG. 1 includes a lens device 40 which has an imaging lens 1 including a focus lens for focus adjustment, a zoom lens for changing a zoom magnification, and the like, a diaphragm 2, a lens control unit 4, a lens drive unit 8, and a diaphragm drive unit 9. In this embodiment, although an example where the lens device 40 is detachably mounted in a digital camera body will be described, the lens device 40 may be fixed into the digital camera body.

The imaging lens 1 and the diaphragm 2 constitute an imaging optical system, and the imaging optical system includes at least the focus lens. The focus lens is a lens for adjusting the focus of the imaging optical system, and is constituted of a single lens or a plurality of lenses. The focus lens moves in an optical axis direction of the imaging optical system, whereby focus adjustment is performed.

The lens control unit 4 of the lens device 40 is configured to communicate with a system control unit 11 in the digital camera body in a wired or wireless manner. The lens control unit 4 drives the focus lens included in the imaging lens 1 through the lens drive unit 8 or drives the diaphragm 2 through the diaphragm drive unit 9 according to a command from the system control unit 11.

The digital camera body includes an imaging element 5 of a CCD type, a CMOS type, or the like which images a subject through the imaging optical system, an analog signal processing unit 6 which is connected to an output of the imaging element 5 and performs an analog signal processing, such as correlated double sampling processing, and an A/D conversion circuit 7 which converts an analog signal output from the analog signal processing unit 6 to a digital signal. The analog signal processing unit 6 and the A/D conversion circuit 7 are controlled by the system control unit 11.

The system control unit 11 which integrally controls an entire electric control system of the digital camera drives the imaging element 5 through an imaging element drive unit 10 and outputs a subject image captured through the lens device 40 as a captured image signal. An instruction signal from a user is input to the system control unit 11 through an operating unit 14.

The system control unit 11 is constituted of a processor and memories, such as a random access memory (RAM) and a read only memory (ROM). The system control unit 11 executes a focusing control program stored in the ROM, thereby implementing respective functions described below.

The electric control system of the digital camera includes a main memory 16, a memory control unit 15 connected to the main memory 16, a digital signal processing unit 17 which performs interpolation calculation, gamma correction calculation, RGB/YC conversion processing, and the like on the captured image signal output from the A/D conversion circuit 7 to generate captured image data, an external memory control unit 20 to which a detachable recording medium 21 is connected, and a display control unit 22 to which a display unit 23 mounted on a camera rear surface or the like is connected.

The memory control unit 15, the digital signal processing unit 17, the external memory control unit 20, and the display control unit 22 are connected to one another by a control bus 24 and a data bus 25, and are controlled according to commands from the system control unit 11.

Figure 2:
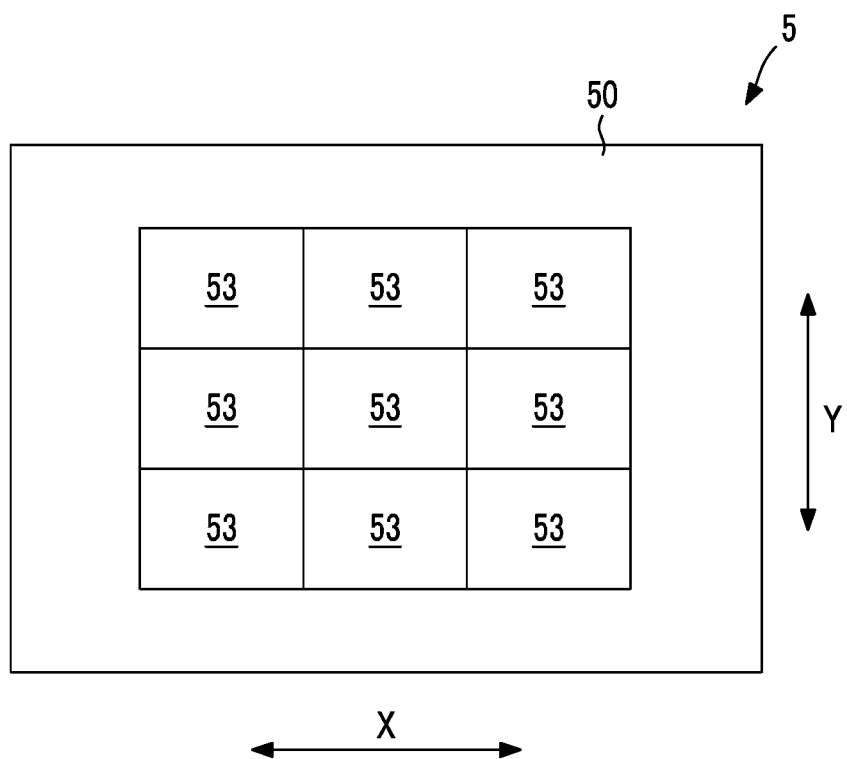
FIG. 2 is a schematic plan view showing the overall configuration of an imaging element 5 which is mounted in the digital camera shown in FIG. 1.

FIG. 2 is a schematic plan view showing the overall configuration of the imaging element 5 which is mounted in the digital camera shown in FIG. 1.

The imaging element 5 has a light receiving surface 50 where multiple pixels arranged in a two-dimensional manner of a row direction X as one direction and a column direction Y orthogonal to the row direction X are provided. In the light receiving surface 50, AF areas 53 to be an area to be focused, in the example of FIG. 2, nine, are provided.

Each AF area 53 is an area which includes imaging pixels and phase difference detection pixels as pixels.

In a portion of the light receiving surface 50 excluding the AF areas 53, only the imaging pixels are provided. The AF areas 53 may be provided with no gap therebetween in the light receiving surface 50.

Figure 3:
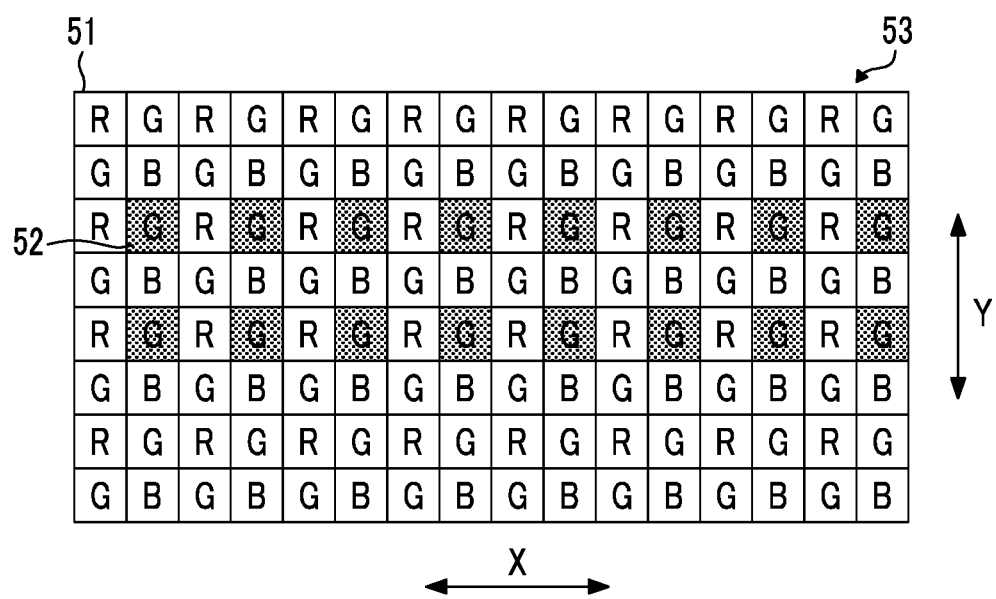
FIG. 3 is a partial enlarged view of one AF area 53 shown in FIG. 2.

FIG. 3 is a partial enlarged view of one AF area 53 shown in FIG. 2.

In each AF area 53, pixels 51 are arranged in a two-dimensional manner. Each pixel 51 includes a photoelectric conversion unit, such as a photodiode, and a color filter formed above the photoelectric conversion unit.

In FIG. 3, a pixel 51 (referred to as R pixel 51) which includes a color filter (R filter) for transmitting red light is marked with a character "R", a pixel 51 (referred to as G pixel 51) which includes a color filter (G filter) for transmitting green light is marked with a character "G", and a pixel 51 (referred to as B pixel 51) which includes a color filter (B filter) for transmitting blue light is marked with a character "B". The array of the color filters is a Bayer array over the entire light receiving surface 50.

In each AF area 53, a part of (shaded pixels 51 in FIG. 3) of the G pixels 51 becomes the phase difference detection pixels 52. In the example of FIG. 3, each R pixel 51 and the G pixel 51 having the same color closest to each G pixel 51 in the column direction Y in an arbitrary pixel row among pixel rows including the R pixels 51 and the G pixels 51 become the phase difference detection pixels 52.

Figure 4:
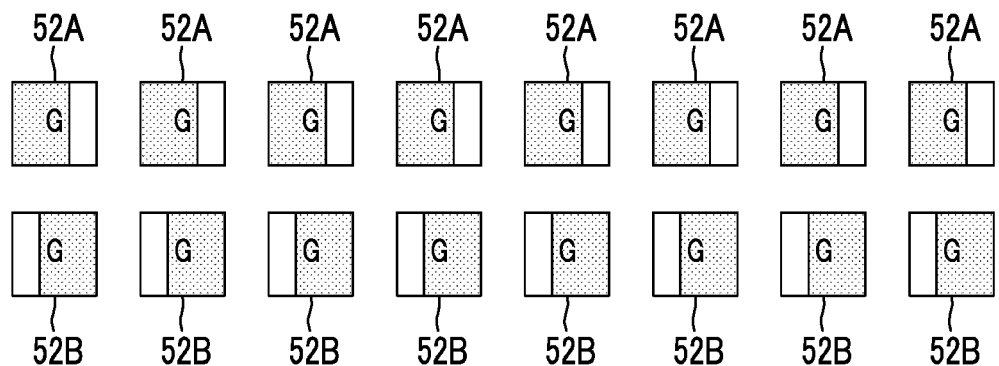
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 include two pixels of a phase difference detection pixel 52A and a phase difference detection pixel 52B.

The phase difference detection pixel 52A is a first signal detection unit which receives one of a pair of luminous fluxes passing through two different portions arranged in the row direction X of a pupil area of the imaging lens 1 and detects a signal according to the amount of received light.

The phase difference detection pixel 52B is a second signal detection unit which receives the other luminous flux of the pair of luminous fluxes and detects a signal according to the amount of received light.

A plurality of pixels 51 other than the phase difference detection pixels 52A and 52B in each AF area 53 are imaging pixels, and the imaging pixels receive the pair of luminous fluxes passing through the imaging lens 1 and detect signals according to the amount of received light.

A light shielding film is provided above the photoelectric conversion unit of each pixel 51, and an opening which defines a light receiving area of the photoelectric conversion unit is formed in the light shielding film.

The center of the opening of the imaging pixel 51 coincides with the center of the photoelectric conversion unit of the imaging pixel 51. In contrast, the center of the opening (a white portion of FIG. 4) of the phase difference detection pixel 52A is eccentric to the right with respect to the center of the photoelectric conversion unit of the phase difference detection pixel 52A. The center of the opening (a white portion of FIG. 4) of the phase difference detection pixel 52B is eccentric to the left with respect to the center of the photoelectric conversion unit of the phase difference detection pixel 52B. The right direction used herein is one direction of the row direction X shown in FIG. 3, and the left direction is another direction of the row direction X.

Figure 5:
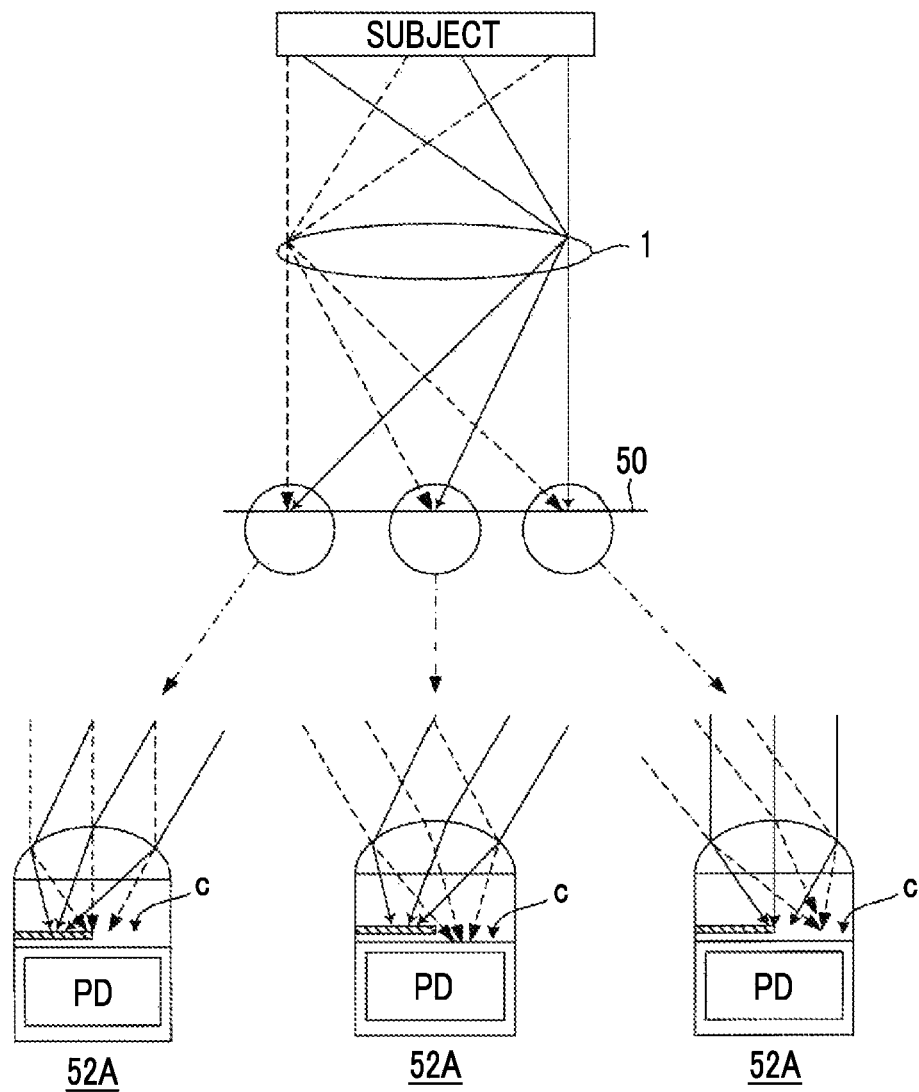
FIG. 5 is a diagram showing the sectional configuration of a phase difference detection pixel 52A.

FIG. 5 is a diagram showing the sectional configuration of the phase difference detection pixel 52A. As shown in FIG. 5, an opening c of the phase difference detection pixel 52A is eccentric to the right with respect to the photoelectric conversion unit (PD). As shown in FIG. 5, one side of the photoelectric conversion unit is covered with the light shielding film, whereby light incident from a direction opposite to a direction of being covered with the light shielding film can be selectively shielded.

With this configuration, using a pixel group having the phase difference detection pixels 52A in an arbitrary row and a pixel group having the phase difference detection pixels 52B at the same distance in one direction with respect to the respective phase difference detection pixels 52A in the pixel group, it is possible to detect the phase difference in the row direction X in images captured by the respective two pixel groups.

The imaging element 5 may have a configuration in which there are a plurality of pairs of first signal detection units configured to receive one of a pair of luminous fluxes passing through different portions in the row direction X of the pupil area of the imaging lens 1 and detect signals according to the amount of received light and second signal detection units configured to receive the other luminous flux of the pair of luminous fluxes and detect signals according to the amount of received light, and is not limited to the configuration shown in FIGS. 2 to 5.

For example, a configuration may be made in which all pixels included in the imaging element 5 are set as the imaging pixels 51, each imaging pixel 51 is divided into two areas, one divided area is set as the phase difference detection pixel 52A, and the other divided area is set as the phase difference detection pixel 52B.

Figure 6:
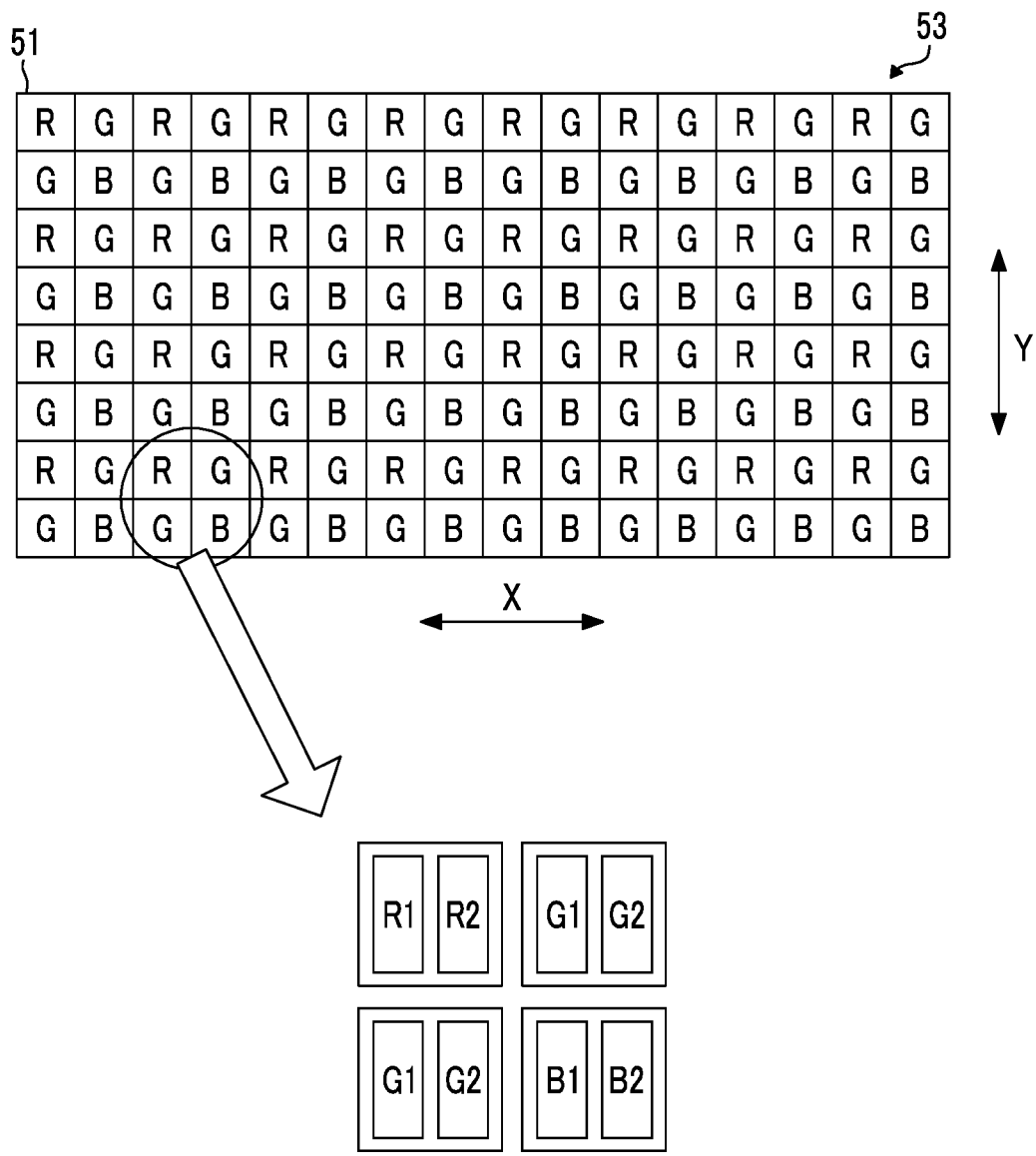
FIG. 6 is a diagram showing a configuration in which all pixels included in the imaging element 5 are set as imaging pixels 51 and each imaging pixel 51 is divided into two areas.

FIG. 6 is a diagram showing a configuration in which all pixels included in the imaging element 5 are set as the imaging pixels 51 and each imaging pixel 51 is divided into two areas.

In the configuration of FIG. 6, each imaging pixel 51 marked with R in the imaging element 5 is divided into two areas, and the two divided areas are respectively set as a phase difference detection pixel R1 and a phase difference detection pixel R2. Each imaging pixel 51 marked with G in the imaging element 5 is divided into two areas, and the two divided areas are respectively set as a phase difference detection pixel G1 and a phase difference detection pixel G2. Each imaging pixel 51 marked with B in the imaging element 5 is divided into two areas, the two divided areas are respectively set as a phase difference detection pixel B1 and a phase difference detection pixel B2.

In this configuration, the phase difference detection pixels R1, G1, and B1 respectively become the first signal detection units, and the phase difference detection pixels R2, G2, and B2 respectively become the second signal detection units. The signals can be independently read from the first signal detection units and the second signal detection units. If the signals of the first signal detection units and the second signal detection units are added, a normal imaging signal with no phase difference is obtained. That is, in the configuration of FIG. 6, all pixels are used as both of the phase difference detection pixels and the imaging pixels.

Figure 7:
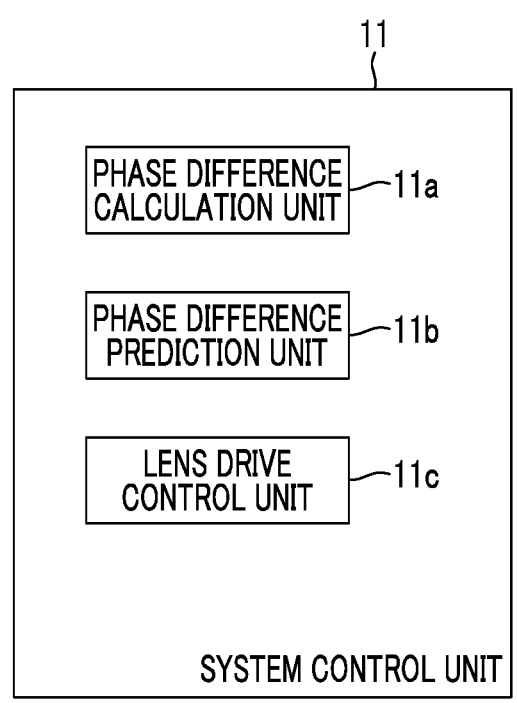
FIG. 7 is a diagram showing functional blocks which are formed by a focusing control program being executed by a system control unit 11 shown in FIG. 2.

FIG. 7 is a diagram showing functional blocks which are formed by a focusing control program being executed by the system control unit 11 shown in FIG. 2. The system control unit 11 executes the focusing control program stored in the ROM, thereby functioning as a phase difference calculation unit 11a, a phase difference prediction unit 11b, and a lens drive control unit 11c.

The phase difference calculation unit 11a calculates, based on at least a result of correlation calculation of a first signal group output from a plurality of phase difference detection pixels 52A in one AF area 53 selected by a user's operation from among the nine AF areas 53 and a second signal group output from the phase difference detection pixels 52B paired with the phase difference detection pixels 52A, a phase difference as a deviation amount between the first signal group and the second signal group in the row direction X.

Specifically, the correlation calculation refers to processing for setting data of the first signal group output from a plurality of phase difference detection pixels 52A as A[1], . . . , and A[k], setting data of the second signal group output from the phase difference detection pixels 52B paired with the phase difference detection pixels 52A as B[1], . . . , and B[k], and calculating a correlation value of two pieces of data when the two pieces of data are deviated by "d" in the row direction X. The correlation value can be calculated by an area S[d] surrounded by two data waveforms calculated by the following expression. The smaller the correlation value, the higher the degree of coincidence of two pieces of data.

$$S[d] = \sum_{n=1}^{k} (A[n+d] - B[n])^2 \quad (1)$$

$$d = -L, \ldots, -2, -1, 0, 1, 2, \ldots, L$$

A graph indicating change in the correlation value when the deviation amount d between two pieces of data is set on the horizontal axis and the area S[d] as the correlation value of two pieces of data is set on the vertical axis is referred to as a correlation curve, and the correlation curve becomes a result of correlation calculation. Since at least one trough portion is included in the correlation curve, the deviation amount d corresponding to any one trough portion included in the correlation curve is calculated as the phase difference between the first signal group and the second signal group in the row direction X.

The lens drive control unit 11c sends a command to the lens drive unit 8 through the lens control unit 4 and makes the lens drive unit 8 drive the focus lens according to a drive amount corresponding to the phase difference calculated by the phase difference calculation unit 11a.

Information indicating the correspondence relationship between the phase difference and the drive amount of the focus lens is determined in advance at the time of manufacturing a digital camera, and is stored in the ROM of the system control unit 11. The lens drive control unit 11c reads the drive amount corresponding to the phase difference from the ROM and transmits the read drive amount to the lens drive unit 8. The lens drive unit 8 moves the focus lens by the transmitted drive amount.

The phase difference prediction unit 11b calculates, based on a coefficient for converting, to a drive amount of the focus lens, a first phase difference calculated by the phase difference calculation unit 11a at a first time when the focus lens is at an arbitrary position and the difference between a movement amount of the focus lens from the arbitrary position at a second time after the focus lens starts to move according to the drive amount and the drive amount, a predicted value of the phase difference at the second time.

The phase difference calculation unit 11a calculates, based on a result of correlation calculation of the first signal group and the second signal group acquired at an arbitrary time and a predicted value of the phase difference calculated by the phase difference prediction unit 11b at this time, a phase difference at this time.

Figure 8:
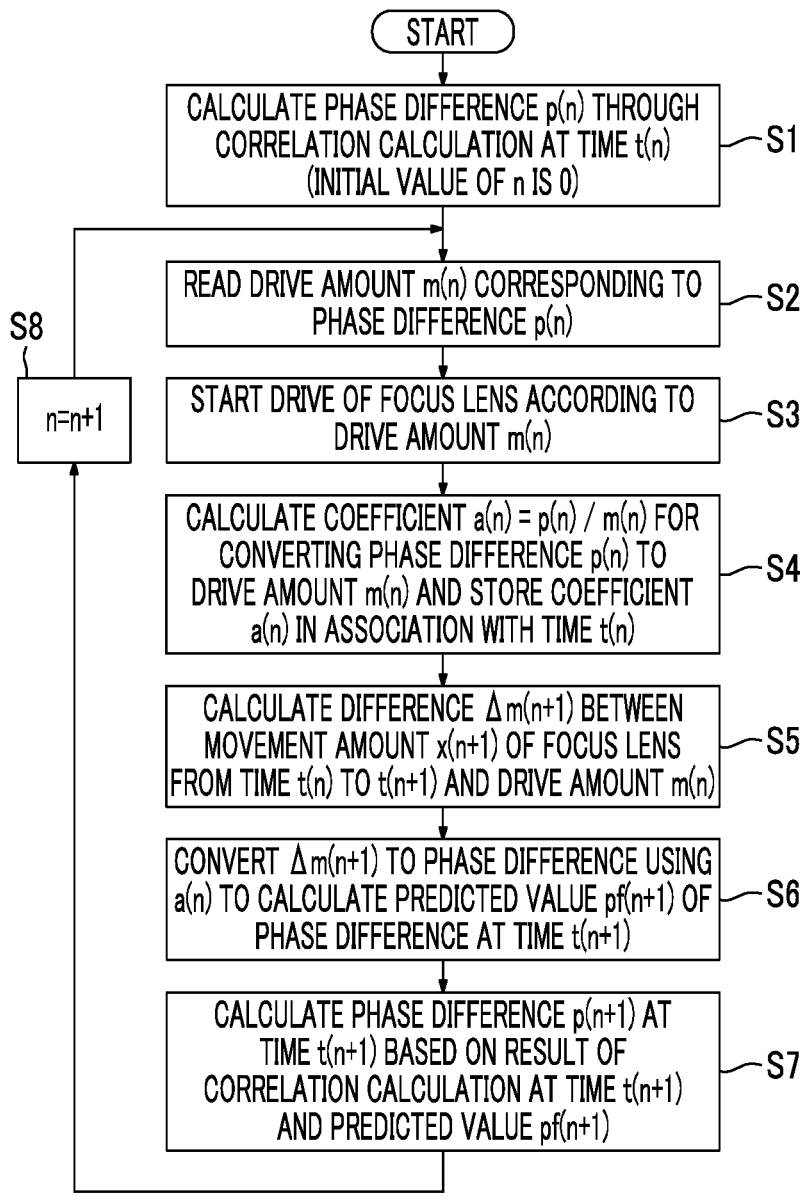
FIG. 8 is a flowchart illustrating the operation of the system control unit 11 shown in FIG. 1.

FIG. 8 is a flowchart illustrating the operation of the system control unit 11 shown in FIG. 1. The operation of FIG. 8 shows an example where focusing control by a phase difference AF method is continuously performed during moving image capturing, for example.

If a moving image capturing mode is set, the phase difference calculation unit 11a performs correlation calculation of a first signal group and a second signal group output from the imaging element 5 at a time t(n) (where an initial value of n is 0) and calculates a phase difference p(n) at the time t(n) based on the result of the correlation calculation (Step S1).

Here, t(n) means that the number of a time series at the time of calculation is "n", and t(n) represents an n-th time. For example, with a certain time as t(0)=0, since a time when signals subjected to correlation calculation are acquired is after 0.5 seconds, t(1)=0.5.

For example, the phase difference calculation unit 11a specifies a trough portion where a difference from an average value of the correlation values constituting all trough portions becomes equal to or greater than a predetermined value among the correlation values constituting all trough portions of the correlation curve obtained by the correlation calculation, and calculates a deviation amount d corresponding to the trough portion as the phase difference p(n). In a case where such a trough portion cannot be specified to one, the phase difference calculation unit 11a repeats the processing of Step S1 until the trough portion is specified to one.

Next, the lens drive control unit 11c reads a drive amount m(n) of the focus lens corresponding to the phase difference p(n) calculated by the phase difference calculation unit 11a from the ROM (Step S2). Then, the lens drive control unit 11c makes the lens drive unit 8 start the drive of the focus lens according to the read drive amount m(n) (Step S3).

If the focus lens starts to move with the drive of the lens drive unit 8, the phase difference prediction unit 11b calculates a coefficient a(n) for converting the phase difference p(n) to the drive amount m(n) and stores the calculated coefficient a(n) in the RAM in association with the calculation time t(n) of the phase difference p(n) (Step S4).

The coefficient a(n) can be calculated by calculation of {p(n)/m(n)} or {m(n)/p(n)}. Hereinafter, description will be provided as to the coefficient a(n)={m(n)/p(n)}.

Figure 9:
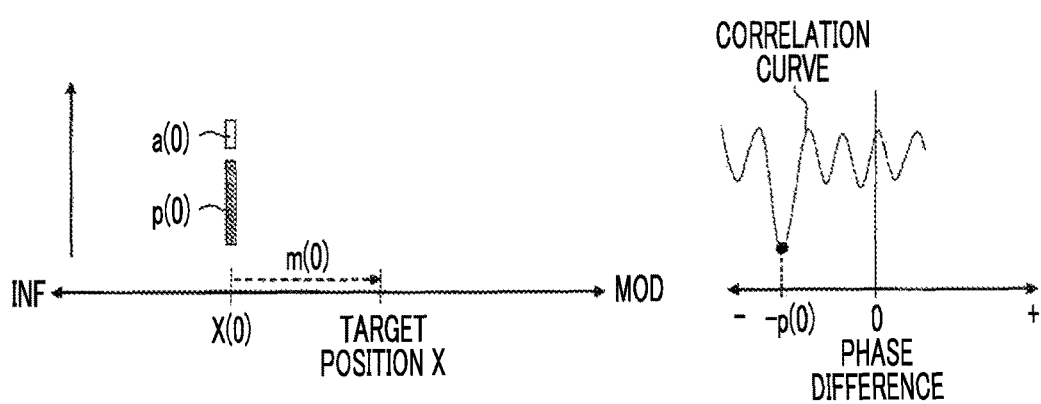
FIG. 9 is a diagram illustrating processing of Steps S1 to S4 of FIG. 8.

FIG. 9 is a diagram illustrating processing of Steps S1 to S4 of FIG. 8.

In FIG. 9, the position of the focus lens at a time t(0) is x(0). A diagram shown on the right side of FIG. 9 is a diagram showing a result of correlation calculation at the time t(0). There are a plurality of trough portions in the correlation curve, and a phase difference −p(0) corresponding to the smallest trough portion among a plurality of trough portions is calculated in Step S1. Then, if a drive amount m(0) corresponding to the phase difference −p(0) is determined, the focus lens starts to move according to the drive amount m(0). A coefficient a(0) is calculated from the phase difference −p(0) and the drive amount m(0), and is stored in association with the time t(0).

Returning to FIG. 8, the focus lens starts to move in Step S3, and when the time becomes t(n+1), the phase difference prediction unit 11b calculates the difference Δm(n+1) between a movement amount x(n+1) of the focus lens from the time t(n) to the time t(n+1) and the drive amount m(n) (Step S5).

Next, the phase difference prediction unit 11b converts the difference Δm(n+1) to a phase difference using the coefficient a(n) and calculates the phase difference as a predicted value of the phase difference at the time t(n+1) (Step S6). Specifically, the phase difference prediction unit 11b calculates a predicted value pf(n+1) by dividing Δm(n+1) by a(n).

If the predicted value pf(n+1) is calculated, the phase difference calculation unit 11a performs correlation calculation of the first signal group and the second signal group output from the imaging element 5 at the time t(n+1) and calculates a phase difference p(n+1) at the time t(n+1) based on the result of the correlation calculation and the predicted value pf(n+1) (Step S7).

For example, the phase difference calculation unit 11a uses information of the predicted value pf(n+1) in specifying a trough portion corresponding to a true phase difference from among all trough portions of the correlation curve obtained by the correlation calculation. Specifically, a value closest to a predicted value pf(1) of the phase difference among the phase differences corresponding to all trough portions is calculated as a final phase difference p(n+1).

Figure 10:
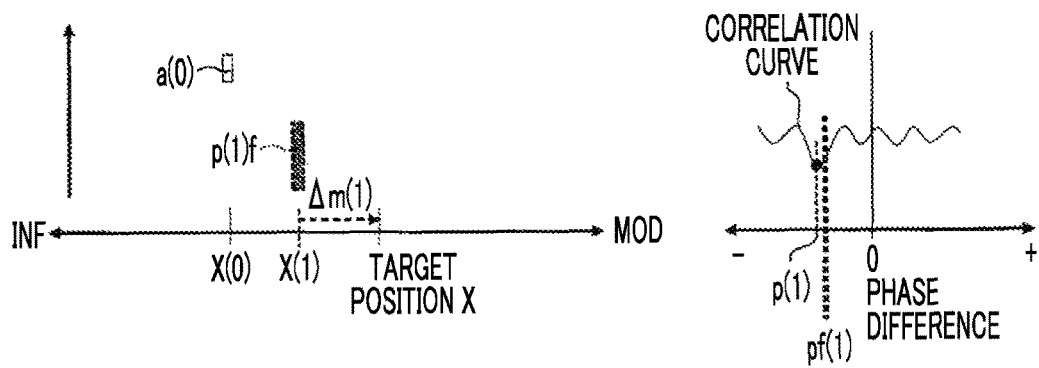
FIG. 10 is a diagram illustrating an operation at the time of change from a state of a time t(0) of FIG. 9 to a time t(1).

FIG. 10 is a diagram illustrating an operation at the time of change from the state of the time t(0) of FIG. 9 to a time t(1). At the time t(1), the focus lens is moving from x(0) to the position of x(1) with respect to the state of the time t(0). Then, the predicted value pf(1) is calculated by calculation of Δm(1)/a(0).

On the right side of FIG. 10, a correlation curve indicating a result of correlation calculation of the first signal group and the second signal group output from the imaging element 5 at the time t(1) is shown.

Since an image to be captured flows in a state where the focus lens is moving, if the correlation calculation is performed in this state, the difference between the correlation values of a plurality of trough portions as shown in FIG. 10 hardly occurs.

If a plurality of trough portions become the substantially same correlation value, there is a possibility that an incorrect phase difference is calculated at the time t(1), undershoot in which the focus lens is stopped ahead of a focusing position to be originally reached or overshoot in which the focus lens is beyond a focusing position to be originally reached occurs, and the operation becomes unstable.

Accordingly, the phase difference calculation unit 11a calculates a value closest to a predicted value −pf(1) of the phase difference among the phase differences corresponding to the trough portions of the correlation curve shown in FIG. 10 as the final phase difference p(n+1). With this, the calculation accuracy of the phase difference is increased, and the occurrence of overshoot or undershoot is prevented.

Returning to the description of FIG. 8, if the phase difference p(n+1) is calculated in Step S7, after n is updated to (n+1), the processing after Step S2 is performed again. In the example of FIG. 10, after the time t(1), the drive amount m(0) set in the lens drive unit 8 is reset, and the focus lens starts to move according to a drive amount m(1) corresponding to a phase difference p(1).

As above, according to the digital camera shown in FIG. 1, it is possible to increase the calculation accuracy of the phase difference with the operation described referring to FIG. 8. As shown in FIG. 8, in a case of continuous drive in which correlation calculation is performed during the drive of the focus lens, if there is an error in the phase difference calculated based on the result of the correlation calculation, the movement of the focus lens becomes unstable.

Figure 11:
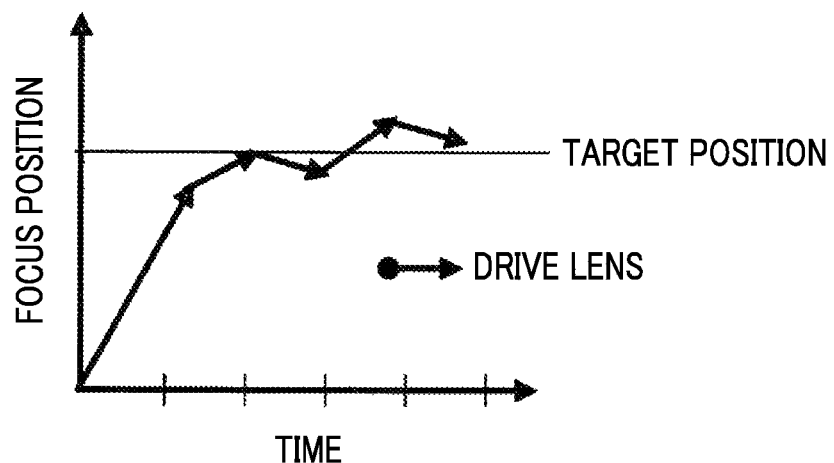
FIG. 11 is a diagram showing continuous drive of AF.

FIG. 11 is a diagram illustrating continuous drive. As shown in FIG. 11, in the continuous drive, if erroneous calculation of the phase difference occurs, overshoot or undershoot occurs, or hunting in which the focus lens repeatedly moves near a target position occurs.

Figure 12:
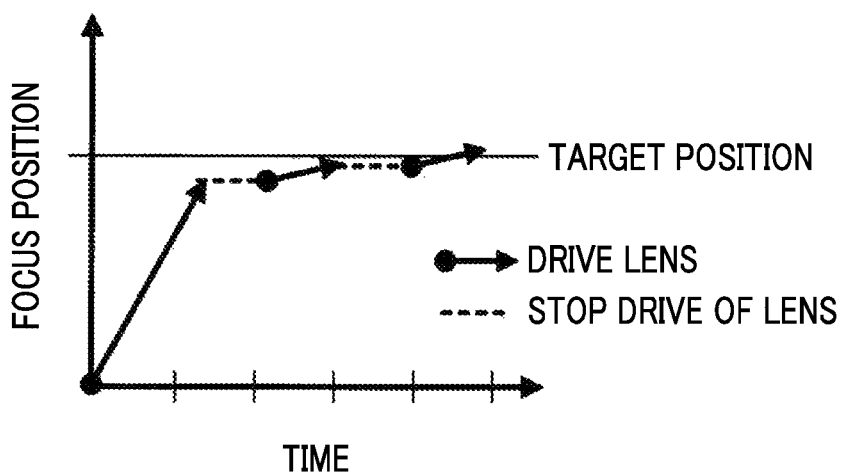
FIG. 12 is a diagram showing intermittent drive of AF.

As shown in FIG. 12, a phase difference is calculated by performing correlation calculation when the focus lens is stopped after the drive of the focus lens starts, and intermittent drive in which an operation to start the drive of the focus lens based on the phase difference is repeated is performed, whereby it is possible to somewhat suppress the occurrence of hunting.

Figure 13:
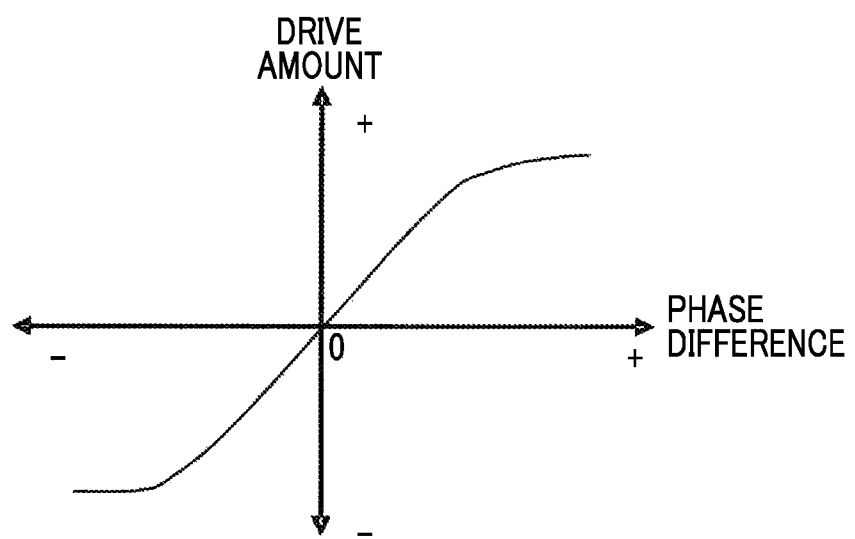
FIG. 13 is a diagram showing the correspondence relationship between a phase difference and a drive amount of a focus lens.

However, as shown in FIG. 13, the correspondence relationship between the phase difference and the drive amount of the focus lens has a tendency that, when the phase difference is larger, a proportional relationship collapses. For this reason, even in the intermittent drive shown in FIG. 12, in a case where the phase difference is large due to large blur, there is a possibility that overshoot or undershoot occurs. In a case where the brightness of the subject is low and noise relatively increases, a case where the spatial frequency of the subject is high, or the like, even if the intermittent drive is executed, a correlation curve may become as shown in FIG. 10, and there is a possibility that overshoot or undershoot occurs.

In contrast, according to the operation shown in FIG. 8, it is possible to calculate, based on the result of the correlation calculation at the arbitrary time and the predicted value of the phase difference at this time, the phase difference at this time with high accuracy. For this reason, it is possible to prevent the occurrence of overshoot, undershoot, and hunting during the continuous drive.

Even in a case where the brightness of the subject is low and noise relatively increases, the spatial frequency of the subject is high, a case where the phase difference is large, or the like, since it is possible to calculate the phase difference with high accuracy, similarly, it is possible to prevent the occurrence of overshoot, undershoot, and hunting.

Figure 14:
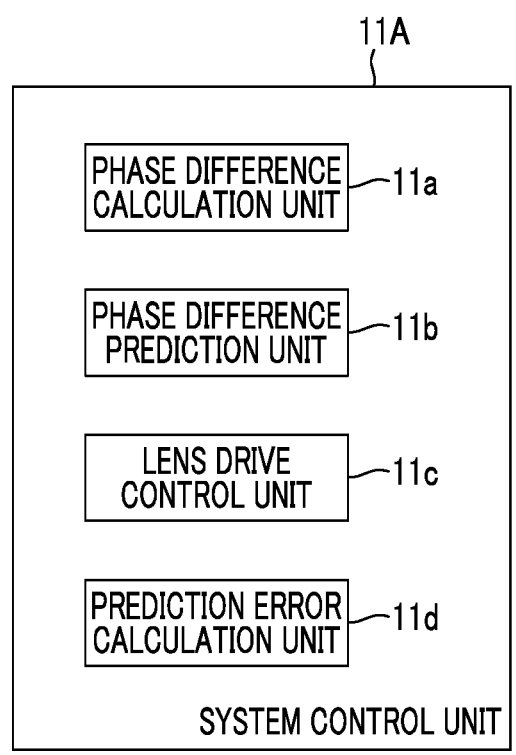
FIG. 14 is a diagram showing a modification example of the system control unit 11 shown in FIG. 1.

FIG. 14 is a diagram showing a modification example of the system control unit 11 shown in FIG. 1. A system control unit 11A shown in FIG. 14 has the same configuration as that of FIG. 7 except that a prediction error calculation unit 11d is added. The prediction error calculation unit 11d is a functional block which is formed by the focusing control program stored in the ROM being executed by the processor.

The prediction error calculation unit 11d of the system control unit 11A shown in FIG. 14 calculates a prediction error Δp(n+1) as the difference between the phase difference p(n+1) calculated based on the predicted value pf(n+1) calculated by the phase difference prediction unit 11b and the result of the correlation calculation and the predicted value pf(n+1), and stores the prediction error Δp(n+1) in the RAM.

The phase difference prediction unit 11b of the system control unit 11A calculates the predicted value pf(n+1) based on the coefficient a(n), the difference Δm(n+1), and a prediction error Δp(n) calculated and stored by the prediction error calculation unit 11d at the time t(n).

Figure 15:
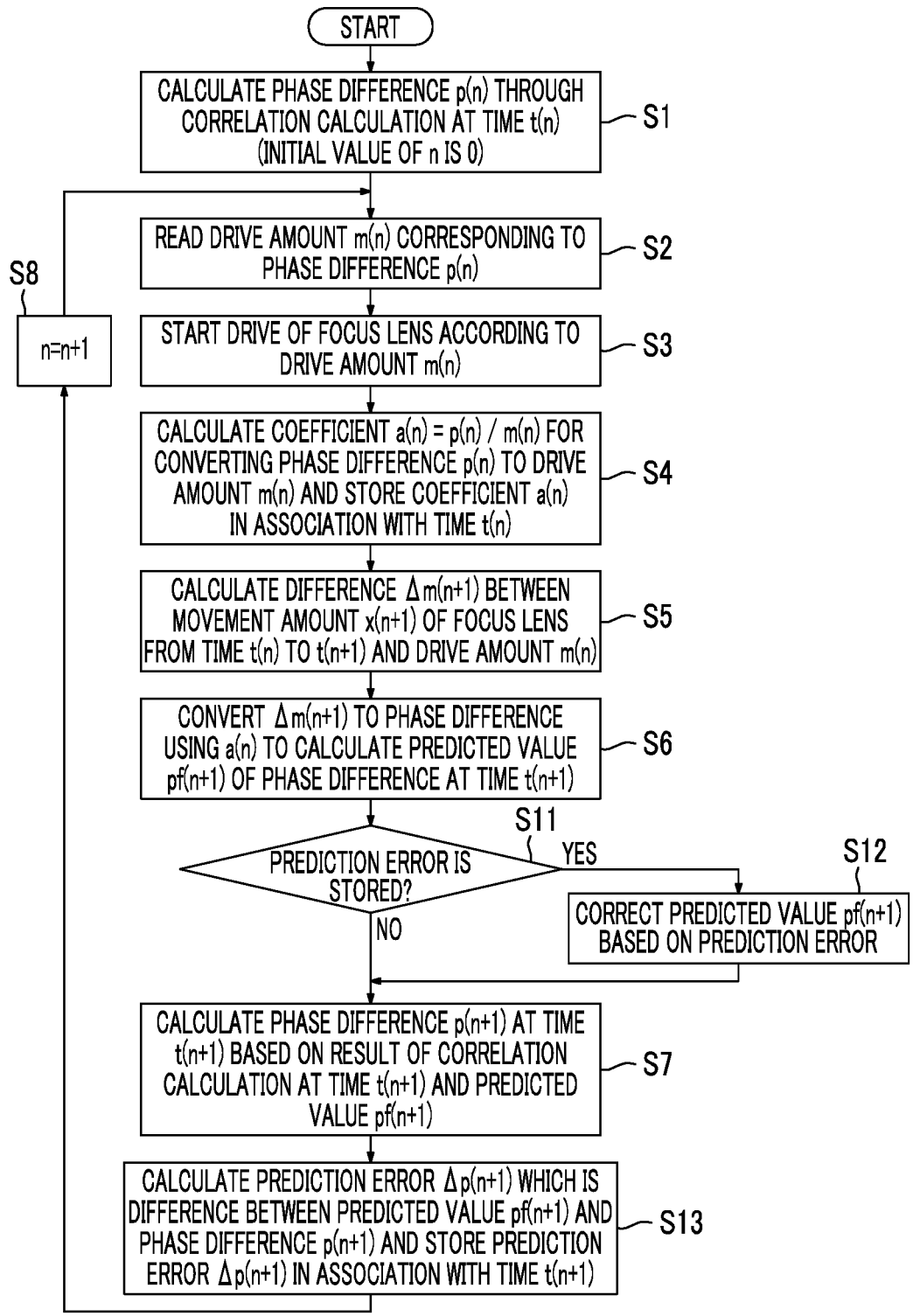
FIG. 15 is a flowchart illustrating the operation of a system control unit 11A shown in FIG. 14.

FIG. 15 is a flowchart illustrating the operation of the system control unit 11A shown in FIG. 14. In FIG. 15, the same processing as those of FIG. 8 are represented by the same reference numerals, and description thereof will not be repeated.

After Step S6, the phase difference prediction unit 11b determines whether or not a prediction error is stored in the RAM (Step S11).

In a case where a prediction error is not stored in the RAM (Step S11: NO), processing of Step S7 is performed. After Step S7, the prediction error calculation unit 11d calculates the prediction error Δp(n+1) as the difference between the phase difference p(n+1) calculated in Step S7 and the predicted value pf(n+1) used in calculating of the phase difference in Step S7 by Expression (2) or (3) described below. Then, the prediction error calculation unit 11d stores the prediction error Δp(n+1) in the RAM in association with the time t(n+1) (Step S13). After Step S13, processing of Step S8 is performed, and then, the process returns to Step S2.

$$\text{prediction error } \Delta p(n+1) = \{\text{phase difference } p(n+1)\} - \{\text{predicted value } pf(n+1)\} \quad (2)$$

$$\text{prediction error } \Delta p(n+1) = \{\text{predicted value } pf(n+1)\} - \{\text{phase difference } p(n+1)\} \quad (3)$$

If the processing of Step S8 is performed at least once, the determination of Step S11 is YES. In a case where the determination of Step S11 is YES, the phase difference prediction unit 11b corrects the predicted value pf(n+1) calculated in Step S6 based on a prediction error Δp{(n+1)−1}) stored in the RAM in association with a previous time t{(n+1)−1} of the time t(n+1) (Step S12).

If the prediction error Δp(n+1) is calculated by Expression (2), the phase difference prediction unit 11b obtains the predicted value pf(n+1) after correction by adding Δp{(n+1)−1} to the predicted value pf(n+1).

If the prediction error Δp(n+1) is calculated by Expression (3), the phase difference prediction unit 11b obtains the predicted value pf(n+1) after correction by subtracting Δp{(n+1)−1} from the predicted value pf(n+1).

After Step S12, the process progresses to Step S7, and the phase difference calculation unit 11a calculates the phase difference p(n+1) at the time t(n+1) based on the predicted value pf(n+1) after correction in Step S12 and the result of the correlation calculation at the time t(n+1).

As above, since the system control unit 11A corrects a predicted value pf(2) calculated at the next time t(2) using a prediction error Δp(1) as the difference between the predicted value pf(1) calculated at the time t(1) and the phase difference p(1) calculated using the predicted value pf(1), it is possible to increase the accuracy of the predicted value pf(2), and to calculate the phase difference more accurately.

FIG. 16 is a diagram illustrating the relationship between the position of the focus lens in a case of continuously focusing on a moving subject and an actual focusing position (subject position).

As shown in FIG. 16, a case where a main subject is moving in a given direction and a focusing position is moving away with time is considered. In this case, even if the phase difference p(0) is calculated at the time t(0), and the focus lens completes movement with the drive amount corresponding to the phase difference p(0) at the time t(1), since the focusing position is moving further away at the time t(1), it is not possible to focus on the main subject. The same applies at a subsequent time t(2).

In this way, although the focus lens is driven based on a phase difference close to a predicted value of a phase difference for a moving subject, the phase difference is deviated from a true phase difference, and there is a possibility that the accuracy of the predicted value is degraded. If the accuracy of the predicted value is degraded, undershoot, overshoot, and a hunting operation easily occurs.

According to the operation shown in FIG. 15, since it is possible to calculate the predicted value of the phase difference at the time t(n+1) using information of the prediction error stored at the time t(n) before the time t(n+1) when the phase difference is calculated, even in a moving subject, it is possible to increase the accuracy of the predicted value, and to calculate a more accurate phase difference. As a result, it is possible to prevent undershoot, overshoot, or a hunting operation.

In the description of FIG. 15, in Step S12, constantly, the predicted value is corrected using the prediction error. However, in a case where the prediction error is small, the processing of Step S12 may be omitted such that the process progresses to Step S7. In the operation of FIG. 15, since it is possible to gradually decrease the prediction error, when the prediction error decreases to some extent, the processing of Step S12 is omitted, whereby it is possible to reduce the amount of calculation.

Figure 17:
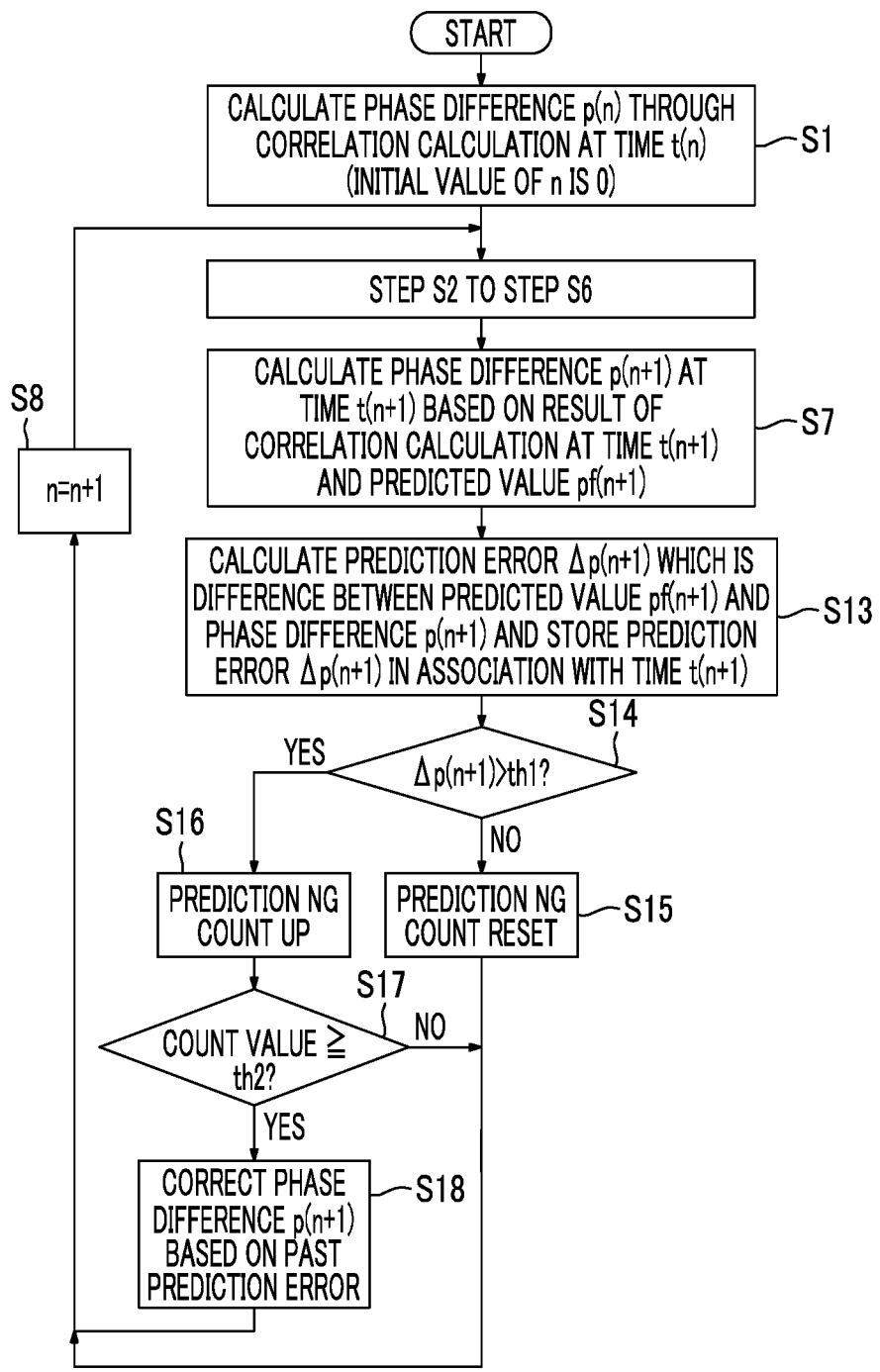
FIG. 17 is a flowchart illustrating a first modification example of the operation of the system control unit 11A.

FIG. 17 is a flowchart illustrating a first modification example of the operation of the system control unit 11A. In FIG. 17, the same processing as those of FIG. 15 are represented by the same reference numerals, and description thereof will not be repeated. For simplification of the drawing, Steps S2 to S6 shown in FIG. 15 are shown as a single processing block.

After Step S7, processing of Step S13 is performed. After Step S13, the lens drive control unit 11c determines whether or not the absolute value of the prediction error Δp(n+1) calculated in Step S13 exceeds a first threshold value th1 (Step S14).

If the determination of Step S14 is NO, the lens drive control unit 11 resets a count value of a prediction NG counter to 0 (Step S15). After Step S15, the process progresses to Step S8.

If the determination of Step S14 is YES, the lens drive control unit 11c counts up the count value of the prediction NG counter by one (Step S16).

After Step S16, the lens drive control unit 11c determines whether or not the count value of the prediction NG counter becomes equal to or greater than a second threshold value th2 (Step S17). The second threshold value th2 is appropriately set to a natural number equal to or greater than 2. If the determination of Step S17 is NO, the process progresses to Step S8.

If the determination of Step S17 is YES, the lens drive control unit 11c instructs the phase difference calculation unit 11a to correct the phase difference p(n+1) calculated in Step S7. The phase difference calculation unit 11a corrects the phase difference p(n+1) calculated in Step S7 based on a previous prediction error stored in the RAM according to this instruction (Step S18).

Specifically, the phase difference calculation unit 11a obtains the phase difference p(n+1) after correction by adding or subtracting the prediction error Δp(n) of the predicted value p(n) calculated at the previous time t(n) to or from the phase difference p(n+1).

If the prediction error Δp(n) is calculated by Expression (2), the phase difference calculation unit 11a obtains the phase difference p(n+1) after correction by adding Δp(n) to the phase difference p(n+1). If the prediction error Δp(n) is calculated by Expression (3), the phase difference calculation unit 11a obtains the phase difference p(n+1) after correction by subtracting Δp(n) from the phase difference p(n+1).

After Step S18, the processing of Step S8 is performed, and then, the drive of the focus lens is performed based on the phase difference p(n+1) after correction in Step S18.

For example, as shown in FIG. 16, in a situation in which the position of the focus lens does not catch up on the subject position, a state where the prediction error exceeds the first threshold value th1 is continued the second threshold value th2 or more times. In such a case, the phase difference calculated based on the result of the correlation calculation and the prediction error is corrected by the immediately preceding calculated prediction error, whereby it is possible to focus on even a moving subject with high accuracy.

In Step S18 of FIG. 17, the phase difference p(n+1) is corrected using the prediction error at the time immediately before the time t(n+1) when the phase difference p(n+1) is calculated. As a modification example thereof, the phase difference p(n+1) may be corrected using prediction errors at a plurality of times before the time t(n+1) when the phase difference p(n+1) is calculated.

For example, in correcting the phase difference p(n+1), an average of the prediction errors calculated at the time t(n) and the time t(n−1) may be calculated, and correction may be performed by adding or subtracting the average value to or from the phase difference p(n+1). The number of prediction errors for taking an average may be the same as, for example, the second threshold value th2. With this, it is possible to calculate a higher-accuracy phase difference.

Figure 18:
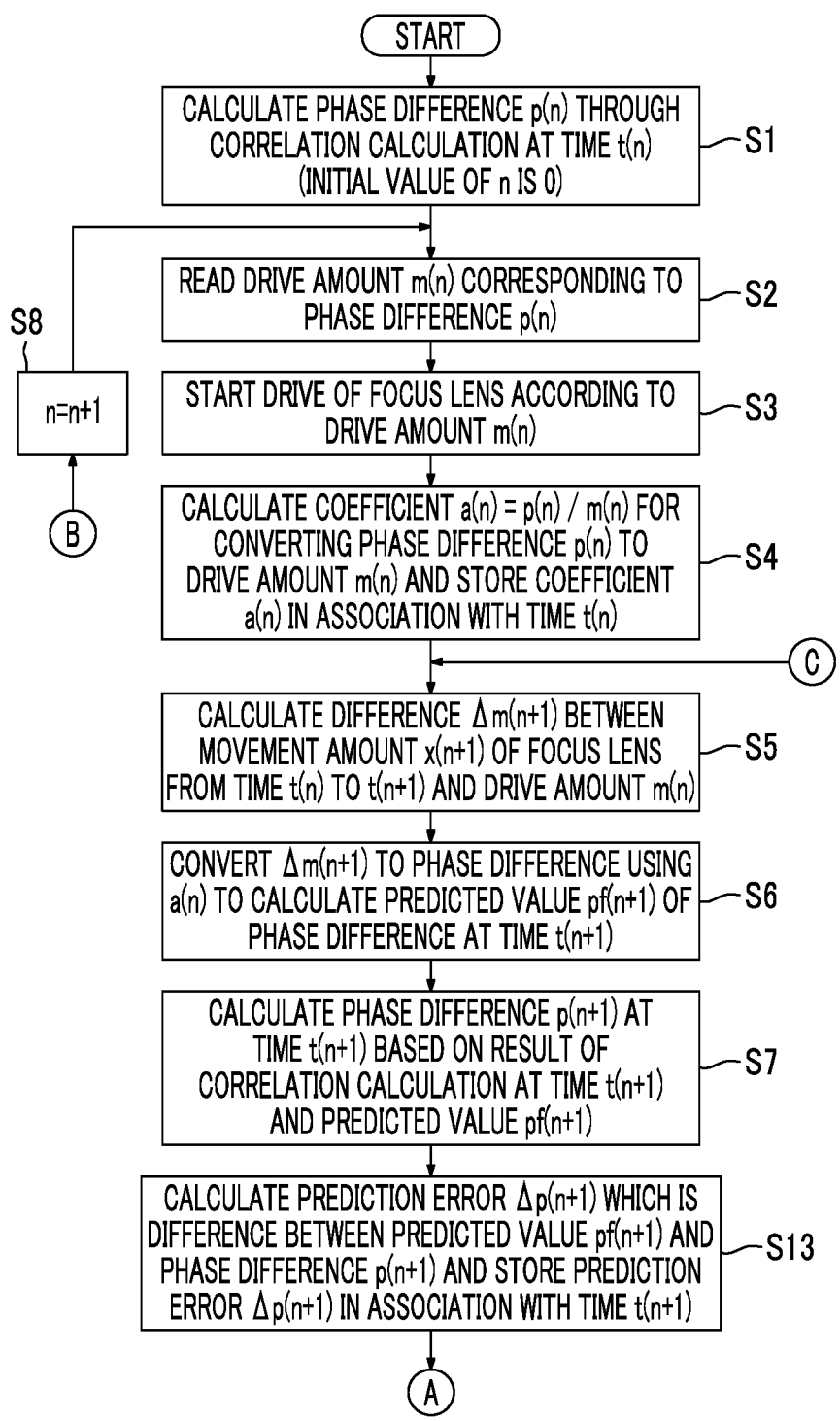
FIG. 18 is a flowchart illustrating a second modification example of the operation of the system control unit 11A.
Figure 19:
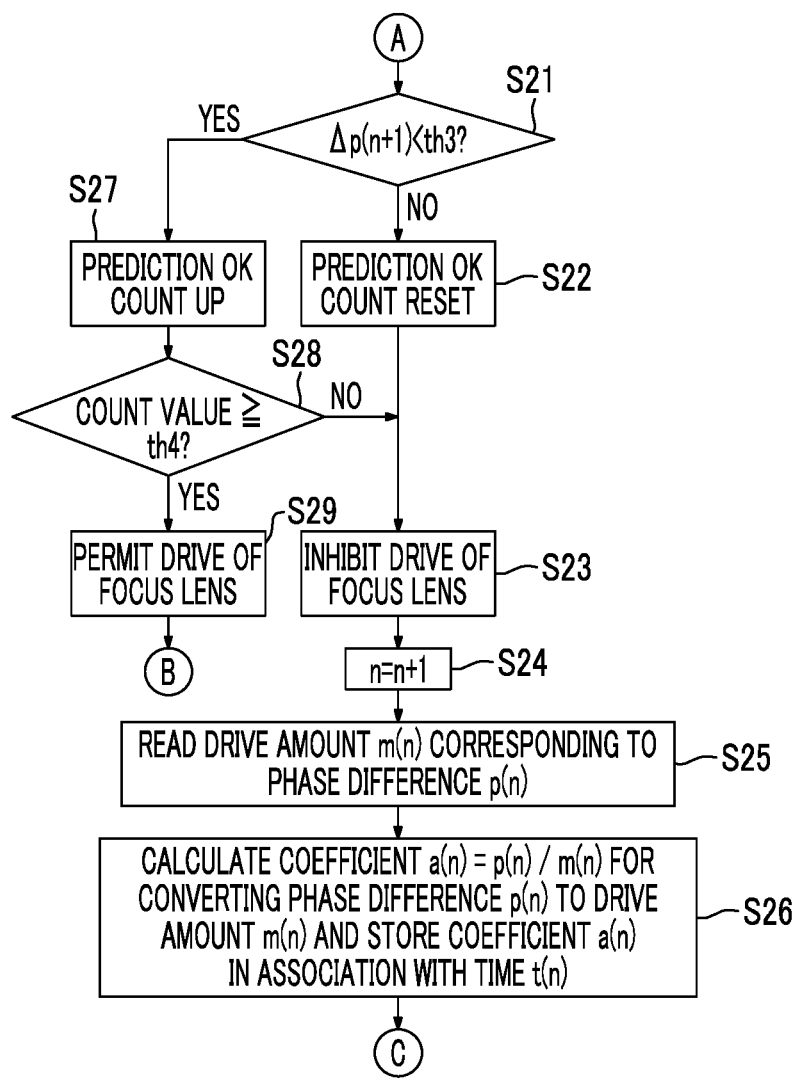
FIG. 19 is a flowchart illustrating the second modification example of the operation of the system control unit 11A.

FIGS. 18 and 19 are flowcharts illustrating a second modification example of the operation of the system control unit 11A. In FIG. 18, the same processing as those of FIG. 15 are represented by the same reference numerals, and description thereof will not be repeated.

After Step S13, the lens drive control unit 11c determines whether or not the absolute value of the prediction error Δp(n+1) calculated in Step S13 is less than a third threshold value th3 (Step S21).

If the determination of Step S21 is YES, the lens drive control unit 11c counts up a count value of a prediction OK counter by one (Step S27).

After Step S27, the lens drive control unit 11c determines whether or not the count value of the prediction OK counter becomes equal to or greater than a fourth threshold value th4 (Step S28). The fourth threshold value th4 is appropriately set to a natural number equal to or greater than 2.

If the determination of Step S28 is YES, the lens drive control unit 11c performs control for permitting the drive of the focus lens (Step S29). Specifically, the process returns to Step S8, and the processing after Step S2 is performed to continue the drive of the focus lens.

If the determination of Step S21 is NO, the lens drive control unit 11c resets the count value of the prediction OK counter to 0 (Step S22). After Step S22, the lens drive control unit 11c performs control for inhibiting the drive of the focus lens (Step S23). Specifically, the lens drive control unit 11c issues an instruction to stop the drive of the focus lens to the lens drive unit 8.

After Step S23, the lens drive control unit 11c updates n to (n+1) (Step S24), and then, processing of Step S25 which is the same as the processing of Step S2 is performed. After Step S25, processing of Step S26 which is the same as the processing of Step S3 is performed, and then, the process progresses to Step S5.

In the second modification example, in a case where the prediction error is equal to or greater than the third threshold value th3, the drive of the focus lens is stopped. In a case where focusing control by the phase difference AF method is performed during moving image capturing, if an object cuts across in front of the digital camera, or an unintended object enters the AF area 53 due to camera shake, subject shake, or the like, the focus lens moves in response to change in the circumstances.

In the second modification example, such change in the circumstances is determined with the magnitude of the prediction error, and when the prediction error is large, the drive of the focus lens is forcibly stopped. For this reason, it is possible to prevent the focus lens from moving due to an unintended subject.

It is possible to obtain the effects of the second modification example even in a case where a phase difference is calculated without using a predicted value. For this reason, in Step S7 of FIG. 18, the phase difference calculation unit 11a may calculate the phase difference p(n+1) only with the result of the correlation calculation without using the predicted value p(n+1).

Figure 20:
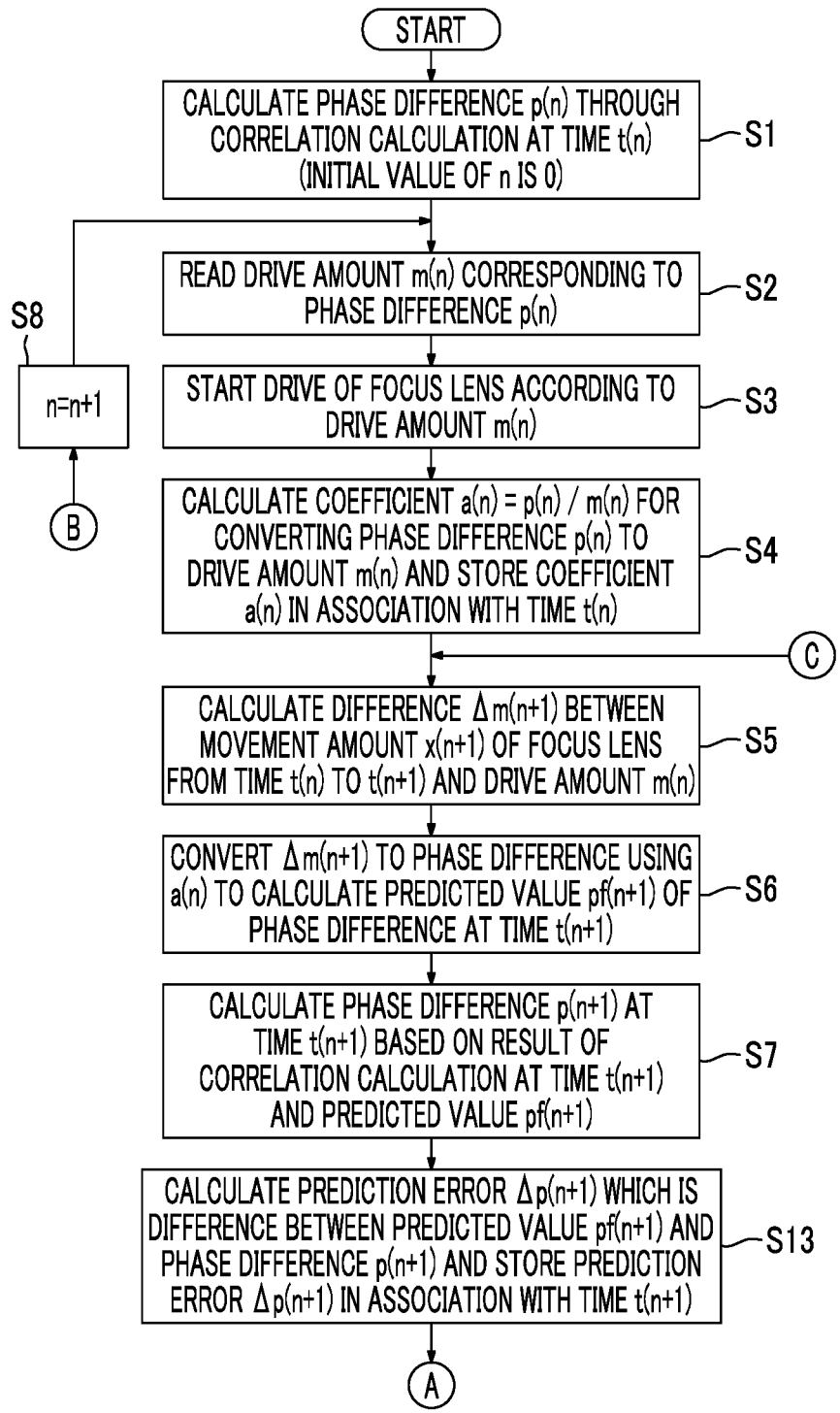
FIG. 20 is a flowchart illustrating a third modification example of the operation of the system control unit 11A.
Figure 21:
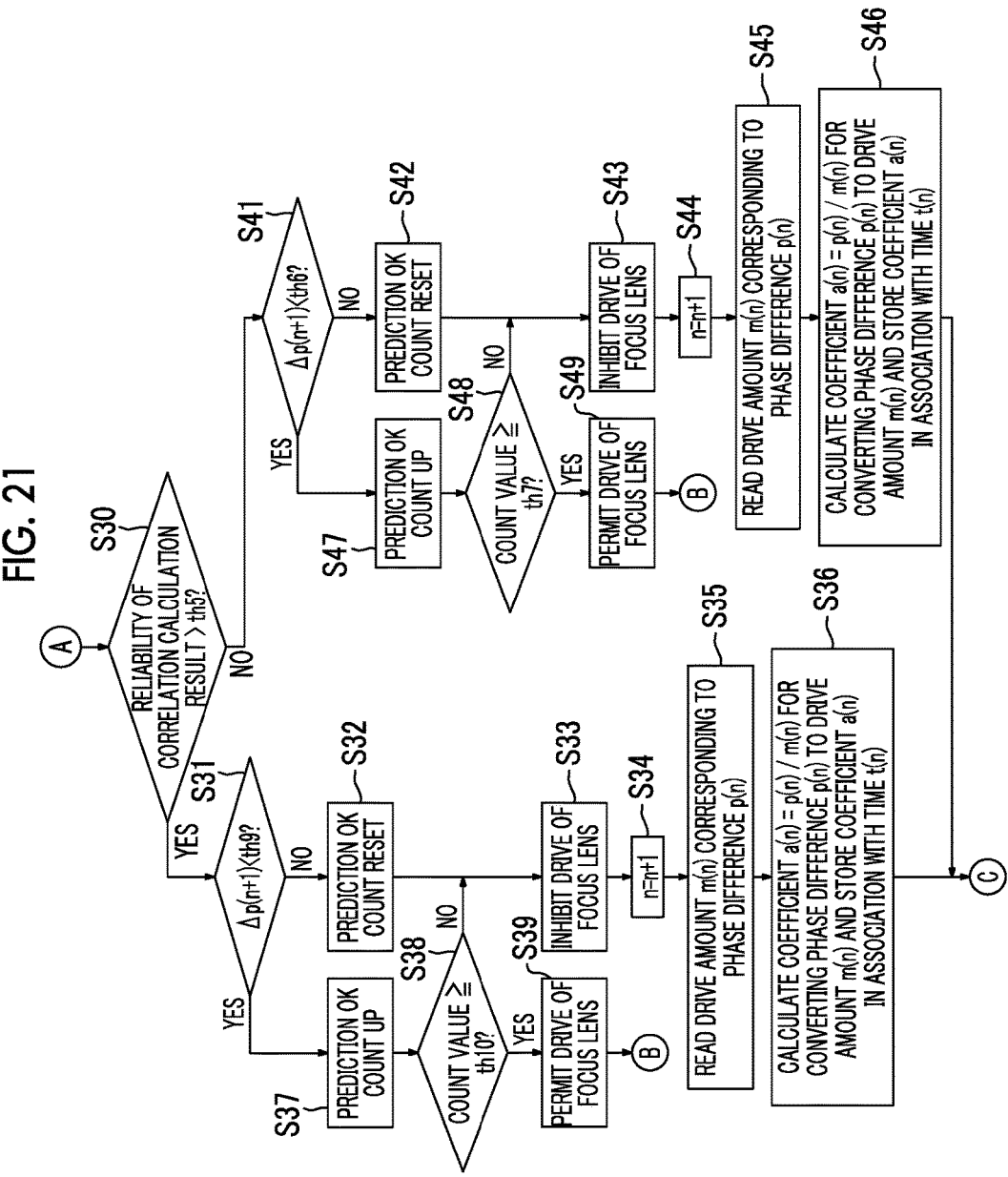
FIG. 21 is a flowchart illustrating the third modification example of the operation of the system control unit 11A.

FIGS. 20 and 21 are flowcharts illustrating a third modification example of the operation of the system control unit 11A. In FIG. 20, the same processing as those of FIG. 15 are represented by the same reference numerals, and description thereof will not be repeated.

After Step S13, the lens drive control unit 11c determines whether or not the reliability of the result of the correlation calculation executed in Step S7 exceeds a fifth threshold value th5 (Step S30).

The reliability of the result of the correlation calculation is degraded in a case where the subject image formed in the AF area has low brightness, a case where the subject image formed in the AF area has low contrast, a case where the spatial frequency of the subject image formed in the AF area is high, or the like. For this reason, for example, the lens drive control unit 11c calculates a brightness average of signals output from the respective pixels in the AF area, determines that the reliability of the correlation calculation exceeds the fifth threshold value th5 in a case where the brightness average is equal to or greater than a predetermined value, and determines that the reliability of the correlation calculation is equal to or less than the fifth threshold value th5 in a case where the brightness average is less than the predetermined value.

The lens drive control unit 11c calculates the contrast or spatial frequency of the subject image captured by the normal pixels of the AF area, determines that the reliability of the correlation calculation exceeds the fifth threshold value th5 in a case where the contrast or the spatial frequency is equal to or greater than a predetermined value, and determines that the reliability of the correlation calculation is equal to or less than the fifth threshold value th5 in a case where the contrast or spatial frequency is less than the predetermined value. A reliability determination method is not limited thereto, and known methods may be used.

When the determination of Step S30 is YES, processing after Step S31 is performed, and when the determination of Step S30 is NO, processing after Step S41 is performed.

In Step S41, the lens drive control unit 11c determines whether or not the absolute value of the prediction error Δp(n+1) calculated in Step S13 is less than a sixth threshold value th6.

If the determination of Step S41 is YES, the lens drive control unit 11c counts up the count value of the prediction OK counter by one (Step S47).

After Step S47, the lens drive control unit 11c determines whether or not the count value of the prediction OK counter becomes equal to or greater than a seventh threshold value th7 (Step S48). The seventh threshold value th7 is appropriately set to a natural number equal to or greater than 2.

If the determination of Step S48 is YES, the lens drive control unit 11c performs control for permitting the drive of the focus lens (Step S49). Specifically, the process returns to Step S8, and the processing after Step S2 is performed to continue the drive of the focus lens.

If the determination of Step S41 is NO, the lens drive control unit 11c resets the count value of the prediction OK counter to 0 (Step S42). After Step S42, the lens drive control unit 11c performs control for inhibiting the drive of the focus lens (Step S43). Even when the determination of Step S48 is NO, in Step S43, the lens drive control unit 11c performs control for inhibiting the drive of the focus lens. Specifically, the lens drive control unit 11c issues an instruction to stop the drive of the focus lens to the lens drive unit 8.

After Step S43, the lens drive control unit 11c updates n to (n+1) (Step S44), and then, processing of Step S45 which is the same as the processing of Step S2 is performed. After Step S45, processing of Step S46 which is the same as the processing of Step S3 is performed. After Step S46, the process progresses to Step S5.

In Step S31, the lens drive control unit 11c determines whether or not the absolute value of the prediction error Δp(n+1) calculated in Step S13 is less than a threshold value th9. The threshold value th9 is a value greater than the threshold value th6.

If the determination of Step S31 is YES, the lens drive control unit 11c counts up the count value of the prediction OK counter by one (Step S37).

After Step S37, the lens drive control unit 11c determines whether or not the count value of the prediction OK counter becomes equal to or greater than a threshold value th10 (Step S38). The threshold value th10 is appropriately set to a natural number equal to or greater than 2. The threshold value th10 is a value smaller than the threshold value th7.

If the determination of Step S38 is YES, the lens drive control unit 11c performs control for permitting the drive of the focus lens (Step S39). Specifically, the process returns to Step S8, and the processing after Step S2 is performed to continue the drive of the focus lens.

If the determination of Step S31 is NO, the lens drive control unit 11c resets the count value of the prediction OK counter to 0 (Step S32). After Step S32 or when the determination of Step S38 is NO, the lens drive control unit 11c performs control for inhibiting the drive of the focus lens (Step S33). Specifically, the lens drive control unit 11c issues an instruction to stop the drive of the focus lens to the lens drive unit 8.

After Step S33, the lens drive control unit 11c updates n to (n+1) (Step S34), and then, processing of Step S35 which is the same as the processing of Step S2 is performed. After Step S35, processing of Step S36 which is the same as the processing of Step S3 is performed. After Step S36, the process progresses to Step S5.

A configuration in which the drive of the focus lens is stopped in a case where the reliability of the correlation calculation result is low is normally considered. In contrast to this configuration, according to the third modification example, even on subject conditions (low brightness, low contrast, and high frequency) for determining that the reliability of the correlation calculation result is low, in a case where a prediction error becomes continuously a small value, focusing control by the phase difference AF method is performed. When the prediction error becomes continuously a small value, it is possible to determine that the accuracy of the calculated phase difference is high to some extent. For this reason, in such a case, the drive of the focus lens is continued, whereby it is possible to extend the subject conditions for performing the phase difference AF.

According to the third modification example, in a case where the reliability of the correlation calculation result is high, it is possible to obtain the effects described in the second modification example. In the third modification example, the threshold value th9 is set to be greater than the sixth threshold value th6, whereby, in a case where the reliability of the correlation calculation result is high, conditions that the count value of the prediction OK count is counted up are made loose. For this reason, in a case where the reliability of the correlation calculation is high, it is possible to increase a possibility that the drive of the focus lens is continued even if the prediction error is large to some extent, and to prevent the drive of the focus lens from being stopped due to slight change in the subject.

In the third modification example, the seventh threshold value th7 is set to be greater than the threshold value th10, whereby, in a case where the reliability of the correlation calculation result is low, the conditions for permitting the drive of the focus lens are made severe. In this way, in a situation in which it is determined that reliability is low, a determination criterion for permitting the drive of the focus lens is made severe, whereby it is possible to prevent degradation of focusing accuracy.

It is possible to obtain the effects of the third modification example even in a case where a phase difference is calculated without using a predicted value. For this reason, in Step S7 of FIG. 20, the phase difference calculation unit 11a may calculate the phase difference p(n+1) only with the result of the correlation calculation without using the predicted value p(n+1).

Figure 22:
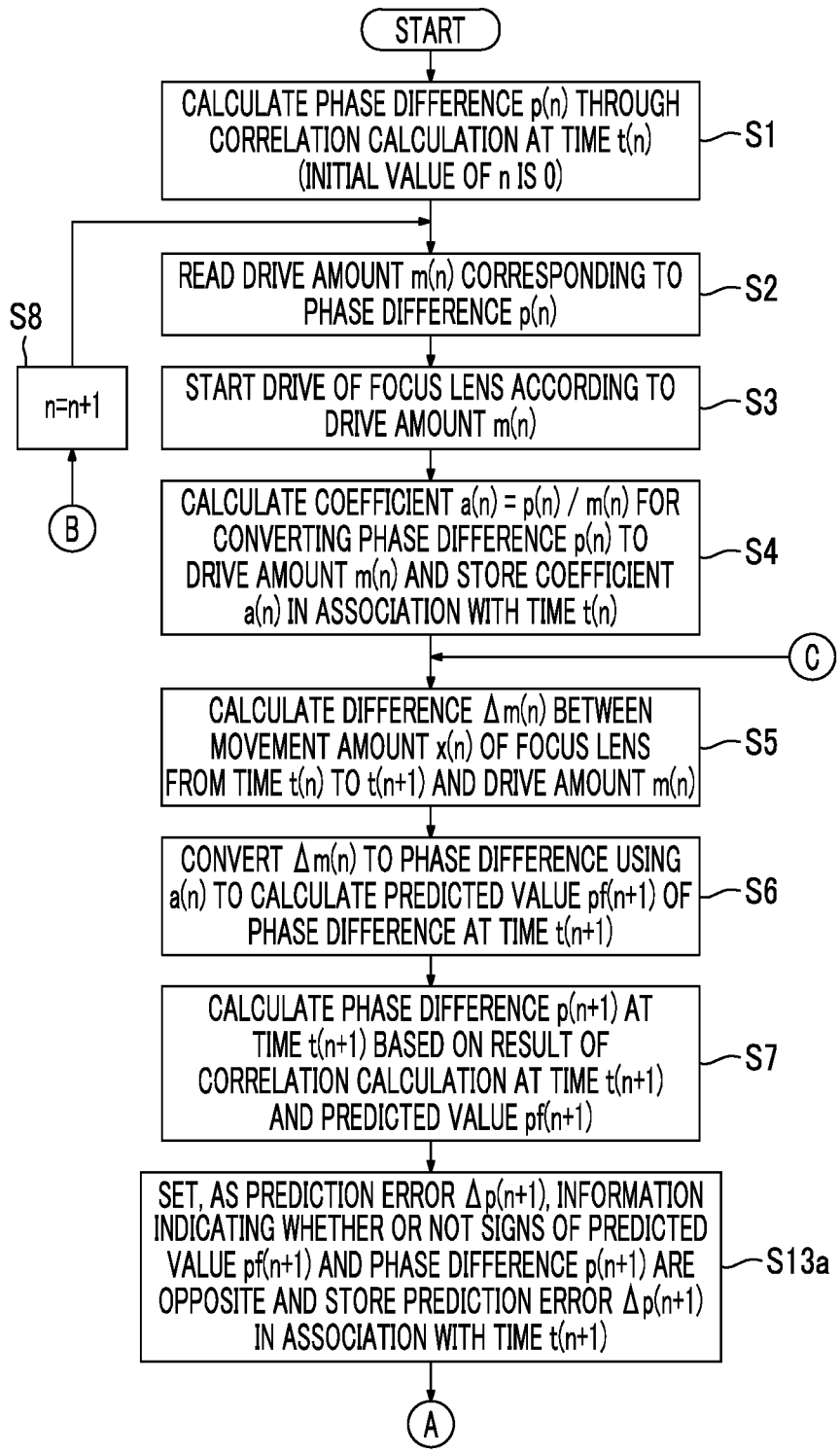
FIG. 22 is a flowchart illustrating a fourth modification example of the operation of the system control unit 11A.
Figure 23:
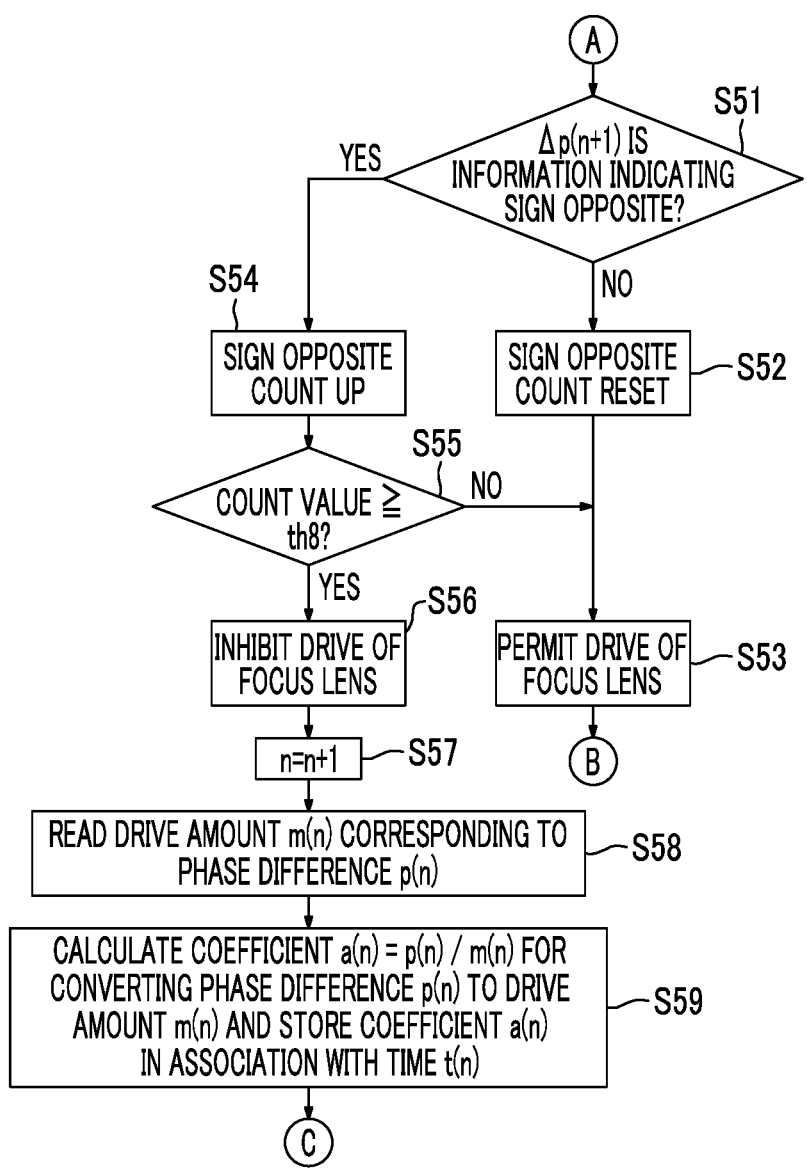
FIG. 23 is a flowchart illustrating the fourth modification example of the operation of the system control unit 11A.

FIGS. 22 and 23 are flowcharts illustrating a fourth modification example of the operation of the system control unit 11A. In FIG. 22, the same processing as those of FIG.

15 are represented by the same reference numerals, and description thereof will not be repeated. After Step S7, the prediction error calculation unit 11d compares the predicted value pf(n+1) calculated in Step S6 and the phase difference p(n+1) calculated in Step S7 to determine whether or not the signs of both are opposite.

The prediction error calculation unit 11d generates either opposite sign information indicating that the signs of both are opposite or identical sign information indicating that the signs of both are identical as the prediction error Δp(n+1) indicating an error of the predicted value pf(n+1) and the phase difference p(n+1), and stores the generated prediction error Δp(n+1) in the RAM in association with the time t(n+1) (Step S13a).

After Step S13a, the lens drive control unit 11c determines whether or not the prediction error Δp(n+1) calculated in Step S13a is opposite sign information (Step S51).

If the determination of Step S51 is NO, the lens drive control unit 11c resets a count value of a sign opposite counter to 0 (Step S52). After Step S52, the lens drive control unit 11c performs control for permitting the drive of the focus lens (Step S53). Specifically, the process returns to Step S8, and the processing after Step S2 is performed to continue the drive of the focus lens.

If the determination of Step S51 is YES, the lens drive control unit 11c counts up the count value of the sign opposite counter by one (Step S54). After Step S54, the lens drive control unit 11c determines whether or not the count value of the sign opposite counter becomes equal to or greater than an eighth threshold value th8 (Step S55). The eighth threshold value th8 is appropriately set to a natural number equal to or greater than 2. If the determination of Step S55 is NO, the process progresses to Step S53.

If the determination of Step S55 is YES, the lens drive control unit 11c performs control for inhibiting the drive of the focus lens (Step S56). Specifically, the lens drive control unit 11c issues an instruction to stop the drive of the focus lens to the lens drive unit 8.

After Step S56, the lens drive control unit 11c updates n to (n+1) (Step S57), and then, processing of Step S58 which is the same as the processing of Step S2 is performed. After Step S58, processing of Step S59 which is the same as the processing of Step S3 is performed. After Step S59, the process progresses to Step S5.

In this way, in a case where a state of the signs of the predicted value and the phase difference being opposite is continued, the drive of the focus lens is inhibited, whereby, even in a case where hunting occurs, it is possible to instantly eliminate hunting, and to implement a stable operation.

It is possible to obtain the effects of the fourth modification example even in a case where a phase difference is calculated without using a predicted value. For this reason, in Step S7 of FIG. 22, the phase difference calculation unit 11a may calculate the phase difference p(n+1) only with the result of the correlation calculation without using the predicted value p(n+1).

Figure 24:
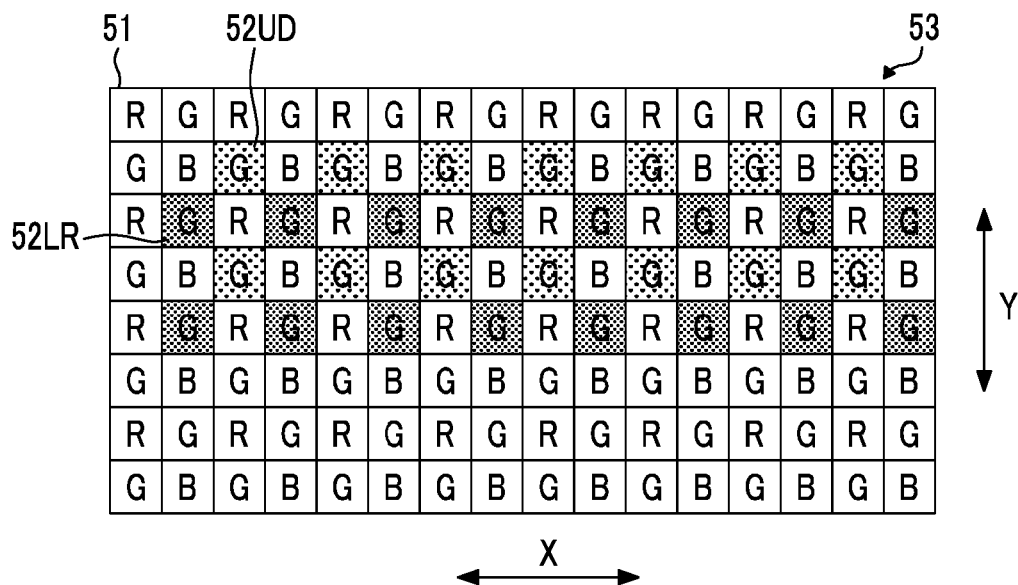
FIG. 24 is a diagram showing a modification example of the AF area 53 of the imaging element 5 of the digital camera shown in FIG. 1.

FIG. 24 is a diagram showing a modification example of the AF area 53 of the imaging element 5 of the digital camera shown in FIG. 1. In the AF area 53 shown in FIG. 24, a part of G pixels becomes phase difference detection pixels 52LR and phase difference detection pixels 52UD.

The phase difference detection pixels 52LR include phase difference detection pixels 52A and phase difference detection pixels 52B, and an enlarged view showing an example in which only the phase difference detection pixels 52LR are extracted is the same as FIG. 4. The phase difference detection pixels 52UD include phase difference detection pixels 52C and phase difference detection pixels 52D, and an enlarged view showing an example in which only the phase difference detection pixels 52 UD are extracted is shown in FIG. 25.

Figure 25:
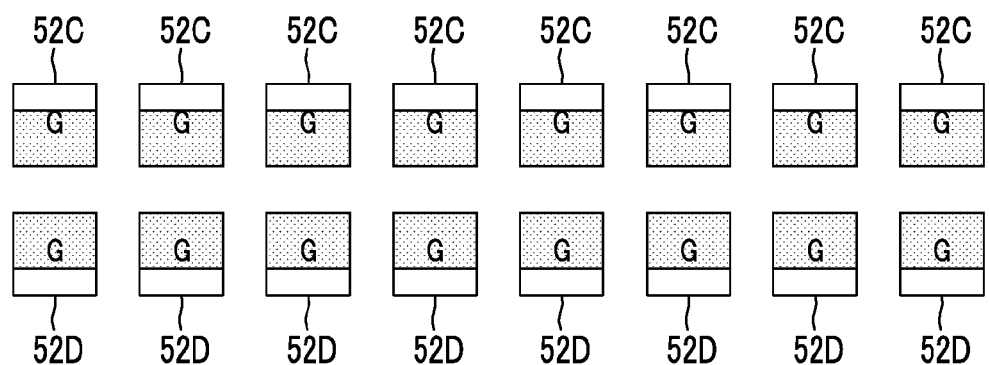
FIG. 25 is a diagram showing an example in which only phase difference detection pixels 52 LR shown in FIG. 24 are extracted.

FIG. 25 is a diagram showing an example in which only the phase difference detection pixels 52 UD shown in FIG. 24 are extracted. As shown in FIG. 25, in the AF area 53, at least a pair row in which a plurality of pairs of the phase difference detection pixels 52C and the phase difference detection pixels 52D arranged in the column direction Y are arranged in the row direction X is included.

The center of the opening (a white portion of FIG. 25) of the phase difference detection pixel 52C is eccentric to the upper side with respect to the center of the photoelectric conversion unit of the phase difference detection pixel 52C. The center of the opening (a white portion of FIG. 25) of the phase difference detection pixel 52D is eccentric to the lower side with respect to the center of the photoelectric conversion unit of the phase difference detection pixel 52D. The upper direction used herein is one direction of the column direction Y, and the lower direction is another direction of the column direction Y.

With this configuration, using a pixel group having the phase difference detection pixels 52C in an arbitrary row and a pixel group having the phase difference detection pixels 52D at the same distance in the column direction Y with respect to the respective phase difference detection pixels 52C of the pixel group, it is possible to detect the phase difference in the column direction Y in images captured by the respective two pixel groups.

In this way, the imaging element 5 of the modification example has a plurality of pairs of first signal detection units (phase difference detection pixels 52A) configured to receive one of a first pair of luminous fluxes passing through different portions arranged in the row direction X of the pupil area of the imaging lens 1 and detect signals according to the amount of received light and second signal detection units (phase difference detection pixels 52B) configured to receive the other luminous flux of the first pair of luminous fluxes and detect signals according to the amount of received light.

The imaging element 5 of the modification example further has a plurality of pairs of third signal detection units (phase difference detection pixels 52C) configured to receive one of a second pair of luminous fluxes passing through different portions in the column direction Y of the pupil area of the imaging lens 1 and detect signals according to the amount of received light and fourth signal detection units (phase difference detection pixels 52D) configured to receive the other luminous flux of the second pair of luminous fluxes and detect signals according to the amount of received light.

Hereinafter, a signal group which is output from a plurality of phase difference detection pixels 52C of FIG. 25 is referred to as a third signal group, and a signal group which is output from a plurality of phase difference detection pixels 52D of FIG. 25 is referred to as a fourth signal group.

Figure 26:
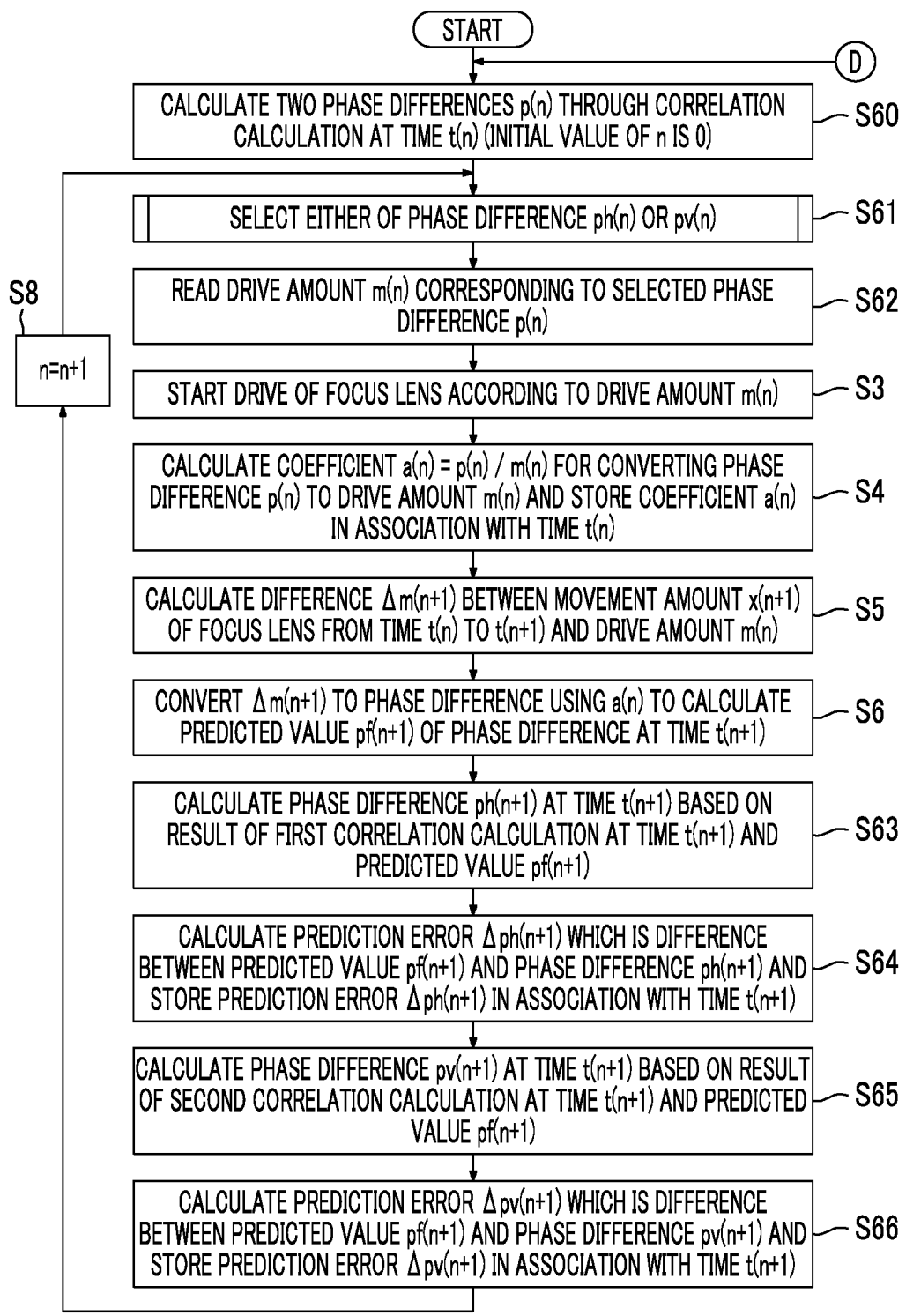
FIG. 26 is a flowchart illustrating the operation of a system control unit 11 in a digital camera having a configuration in which the imaging element 5 of the digital camera shown in FIG. 1 is changed to an imaging element including an AF area shown in FIG. 24.

FIG. 26 is a flowchart illustrating the operation of a system control unit 11 in a digital camera having a configuration in which the imaging element 5 of the digital camera shown in FIG. 1 is changed to an imaging element including the AF area shown in FIG. 24. In FIG. 26, the same processing as those of FIG. 8 are represented by the same reference numerals, and description thereof will not be repeated.

If the moving image capturing mode is set, the phase difference calculation unit 11a performs first correlation calculation of the first signal group and the second signal group output from the imaging element 5 at a time t(n) (where an initial value of n is 0) and calculates a phase difference p(n) (hereinafter, referred to as a phase difference ph(n)) at the time t(n) based on the result of the first correlation calculation. The phase difference calculation unit 11a performs second correlation calculation of the third signal group and the fourth signal group output from the imaging element 5 at the time t(n) and calculates a phase difference p(n) (hereinafter, referred to as a phase difference pv(n)) at the time t(n) based on the result of the second correlation calculation (Step S60). The phase difference calculation unit 11a stores the calculated phase difference ph(n) and the phase difference pv(n) in the RAM in association with the time t(n). The phase difference ph(n) corresponds to a first phase difference, and the phase difference pv(n) corresponds to a second phase difference.

For example, the phase difference calculation unit 11a specifies a trough portion where a difference from an average value of correlation values constituting all trough portions becomes equal to or greater than a predetermined value among the correlation values constituting all trough portion of the correlation curve obtained by the correlation calculation, and calculates a deviation amount d corresponding to the trough portion as a phase difference. In a case where such a trough portion cannot be specified, the phase difference calculation unit 11a performs error output.

After Step S60, the lens drive control unit 11c selects either of the two phase differences p(n) calculated at the time t(n) (Step S61). Thereafter, the lens drive control unit 11c reads a drive amount m(n) corresponding to the selected phase difference p(n) (Step S62). After Step S62, the processing of Steps S3 to S6 is performed, and then, processing of Step S63 is performed.

In Step S63, the phase difference calculation unit 11a performs the first correlation calculation of the first signal group and the second signal group output from the imaging element 5 at the time t(n+1) and calculates a phase difference ph(n+1) at the time t(n+1) based on the result of the first correlation calculation and the predicted value pf(n+1) calculated in Step S6 in the same method as in Step S7 of FIG. 8. The phase difference calculation unit 11a stores the calculated phase difference ph(n+1) in the RAM in association with the time t(n+1).

Next, the prediction error calculation unit 11d calculates a prediction error $\Delta$ph(n+1) as the difference between the phase difference ph(n+1) and the predicted value pf(n+1) and stores the prediction error $\Delta$ph(n+1) in the RAM in association with the time t(n+1) (Step S64).

Next, the phase difference calculation unit 11a performs the second correlation calculation of the third signal group and the fourth signal group output from the imaging element 5 at the time t(n+1) and calculates a phase difference pv(n+1) at the time t(n+1) based on the result of the second correlation calculation and the predicted value pf(n+1) calculated in Step S6 in the same method as in Step S7 of FIG. 8 (Step S65). The phase difference calculation unit 11a stores the calculated phase difference pv(n+1) in the RAM in association with the time t(n+1).

Next, the prediction error calculation unit 11d calculates a prediction error $\Delta$pv(n+1) as the difference between the phase difference pv(n+1) and the predicted value pf(n+1) and stores the prediction error $\Delta$pv(n+1) in the RAM in association with the time t(n+1) (Step S66). After Step S66, n is updated to (n+1) in Step S8, and then, the process returns to Step S61.

Figure 27:
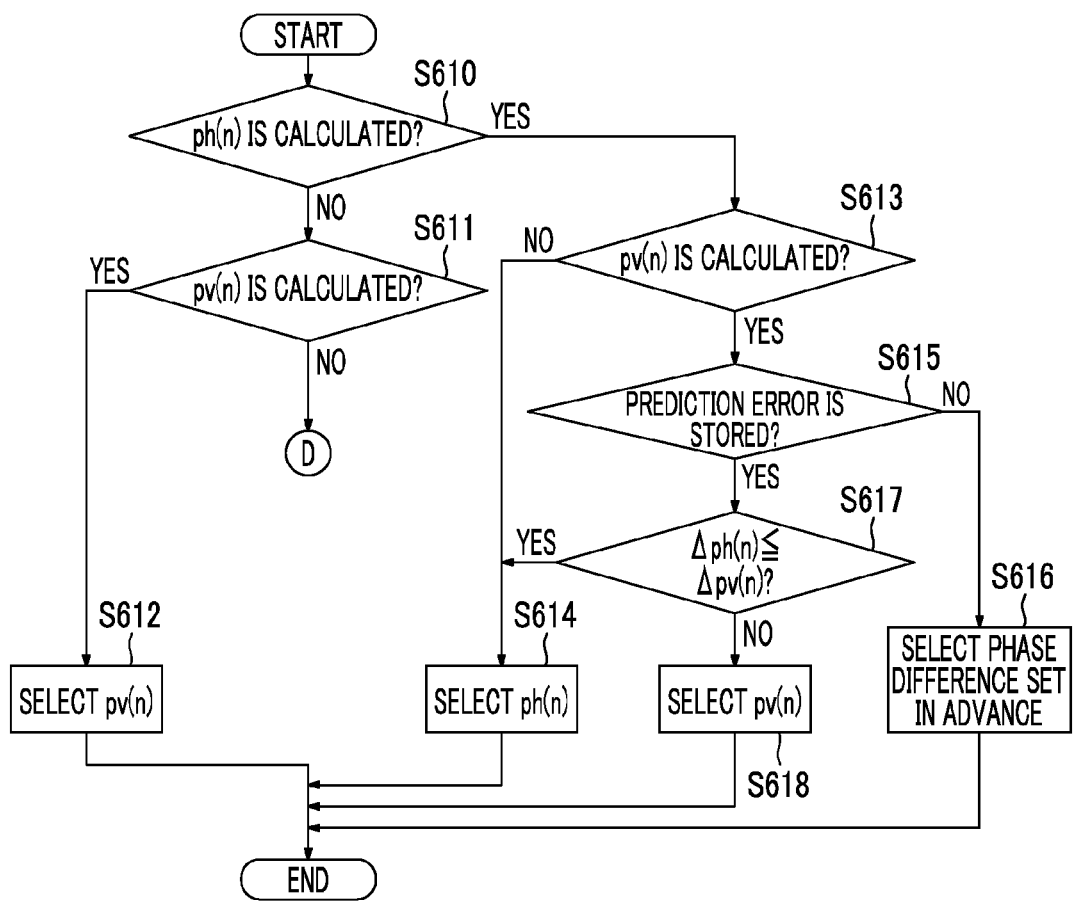
FIG. 27 is a flowchart showing the details of Step S61 in the flowchart shown in FIG. 26.

FIG. 27 is a flowchart showing the details of Step S61 in the flowchart shown in FIG. 26.

The lens drive control unit 11c determines whether or not the phase difference ph(n) is stored in the RAM (Step S610). If the determination of Step S610 is NO, the lens drive control unit 11c determines whether or not the phase difference pv(n) is stored in the RAM (Step S611).

If the determination of Step S611 is YES, the lens drive control unit 11c selects the phase difference pv(n) (Step S612), and ends the process. If the determination of Step S611 is NO, the lens drive control unit 11c returns the process to Step S60.

When the determination of Step S610 is YES, the lens drive control unit 11c determines whether or not the phase difference pv(n) is stored in the RAM (Step S613). If the determination of Step S613 is NO, the lens drive control unit 11 selects the phase difference ph(n) (Step S614), and ends the process.

If the determination of Step S613 is YES, the lens drive control unit 11c determines whether or not the prediction error $\Delta$ph(n) and the prediction error $\Delta$pv(n) are stored in the RAM (Step S615).

If the determination of Step S615 is NO, the lens drive control unit 11c selects a phase difference set in advance (for example, a phase difference designated by the user in advance) of the phase difference pv(n) or the phase difference ph(n) (Step S616), and ends the process.

If the determination of Step S615 is YES, the lens drive control unit 11 determines whether or not $\Delta$ph(n) becomes equal to or less than $\Delta$pv(n) (Step S617).

If the determination of Step S617 is YES, the lens drive control unit 11c performs the processing of Step S614, and if the determination of Step S617 is NO, the lens drive control unit 11c selects the phase difference pv(n) (Step S618) and ends the process.

As above, in a configuration in which two correlation calculation results can be obtained with single imaging, a correlation calculation result having higher reliability of the two correlation calculation results may be selected and the drive of the focus lens may be performed based on the selected correlation calculation result.

As shown in FIGS. 26 and 27, in a case where only the phase difference ph(n) in the row direction X can be calculated or a case where only the phase difference pv(n) in the column direction Y can be calculated, the phase difference capable of being calculated may be selected and the drive of the focus lens may be performed. In a case where both of the phase difference ph(n) in the row direction X and the phase difference pv(n) in the column direction Y can be calculated, it is necessary to determine which of the phase difference ph(n) and the phase difference pv(n) is to be used. Accordingly, as shown in FIG. 26, the drive of the focus lens is performed using a phase difference in a direction in which an error from a predicted value relatively decreases, whereby it is possible to perform high-accuracy focusing control.

It is possible to obtain the effects of the operation described referring to FIGS. 26 and 27 even in a case where a phase difference is calculated without using a predicted value. For this reason, in Step S63 of FIG. 26, the phase difference calculation unit 11a may calculate the phase difference ph(n+1) only with the result of the first correlation calculation without using the predicted value p(n+1).

In Step S65 of FIG. 26, the phase difference calculation unit 11a may calculate the phase difference pv(n+1) only with the result of the second correlation calculation without using the predicted value p(n+1).

However, in a case where a predicted value is not used, since there is a high possibility that calculation of a phase difference cannot be performed (a phase difference at which a correlation value becomes minimum cannot be determined), a configuration in which a phase difference is calculated using a predicted value is desirable.

Figure 28:
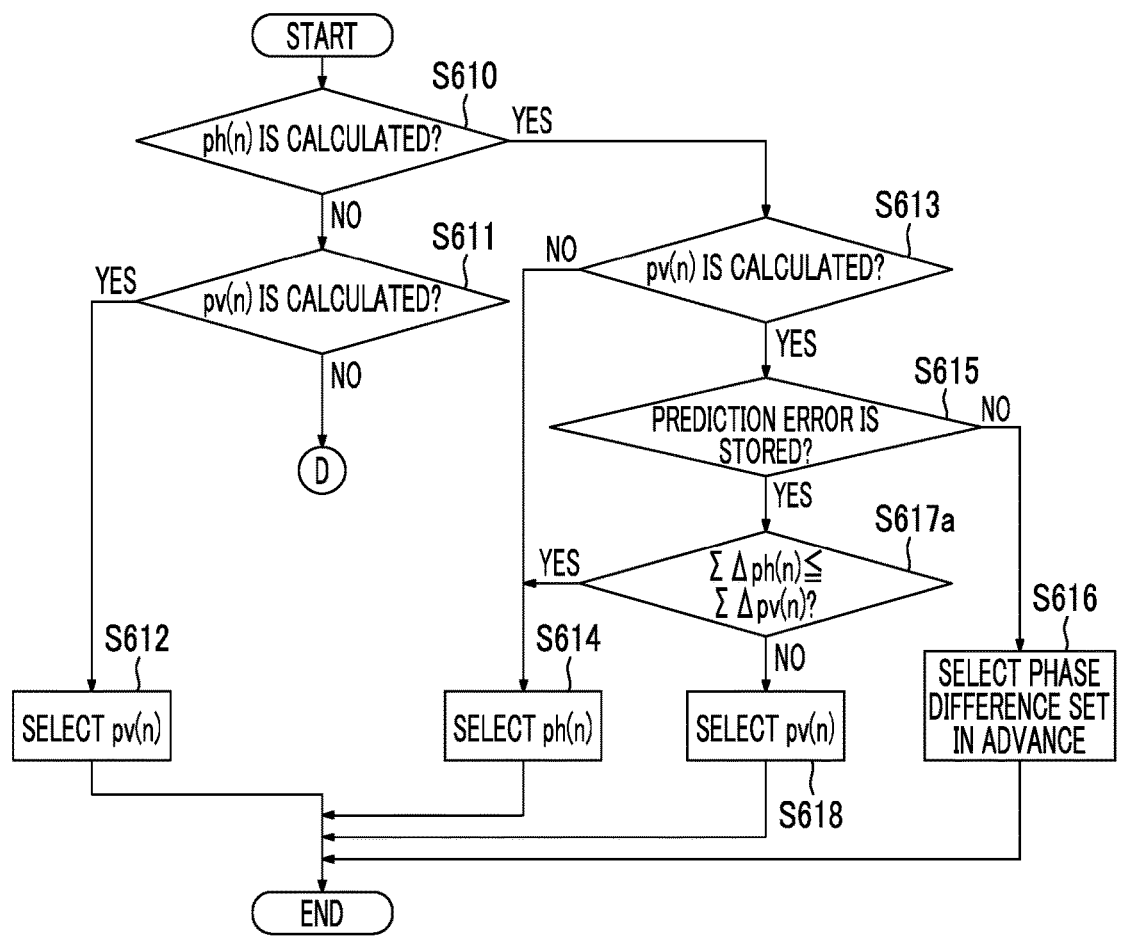
FIG. 28 is a flowchart showing a modification example of Step S61 shown in FIG. 25.

FIG. 28 is a flowchart showing a modification example of Step S61 shown in FIG. 27. In FIG. 28, the same processing as those of FIG. 27 are represented by the same reference numerals, and description thereof will not be repeated. FIG. 28 is different from FIG. 27 only in that Step S617 is changed to Step S617a.

In Step S617a, the lens drive control unit 11c calculates a first integrated value ($\Sigma\Delta$ph(n)) of a plurality of past prediction errors $\Delta$ph(n) stored in the RAM and calculates a second integrated value ($\Sigma\Delta$pv(n)) of a plurality of past prediction errors $\Delta$pv(n) stored in the RAM. Then, the lens drive control unit 11c compares the calculated two integrated values, and if $\Sigma\Delta$ph(n) is equal to or less than $\Sigma\Delta$pv(n) (Step S617a: YES), selects the phase difference ph(n) in Step S614.

If $\Sigma\Delta$ph(n) is greater than $\Sigma\Delta$pv(n) (Step S617a: NO), the lens drive control unit 11c selects the phase difference pv(n) in Step S618.

In this way, the lens drive control unit 11c determines a phase difference in a direction to be used for the drive of the focus lens by comparison of the integrated values of the prediction errors $\Delta$ph(n) and $\Delta$pv(n) calculated in the past. With this, compared to the operation of FIG. 27, it is possible to select a phase difference closer to a true phase difference, and to increase focusing accuracy.

In the modification example described referring to FIGS. 24 to 28, the phase difference calculation unit 11a functions as a first phase difference calculation unit and a second phase difference calculation unit. Furthermore, $\Delta$ph(n) corresponds to a first prediction error, and $\Delta$pv(n) corresponds to a second prediction error.

In the digital camera described above, the system control unit 11 and the system control unit 11A function as a focusing control device. Although a digital camera has been exemplified until now, the invention can be applied in, for example, a camera system for broadcasting.

Figure 29:
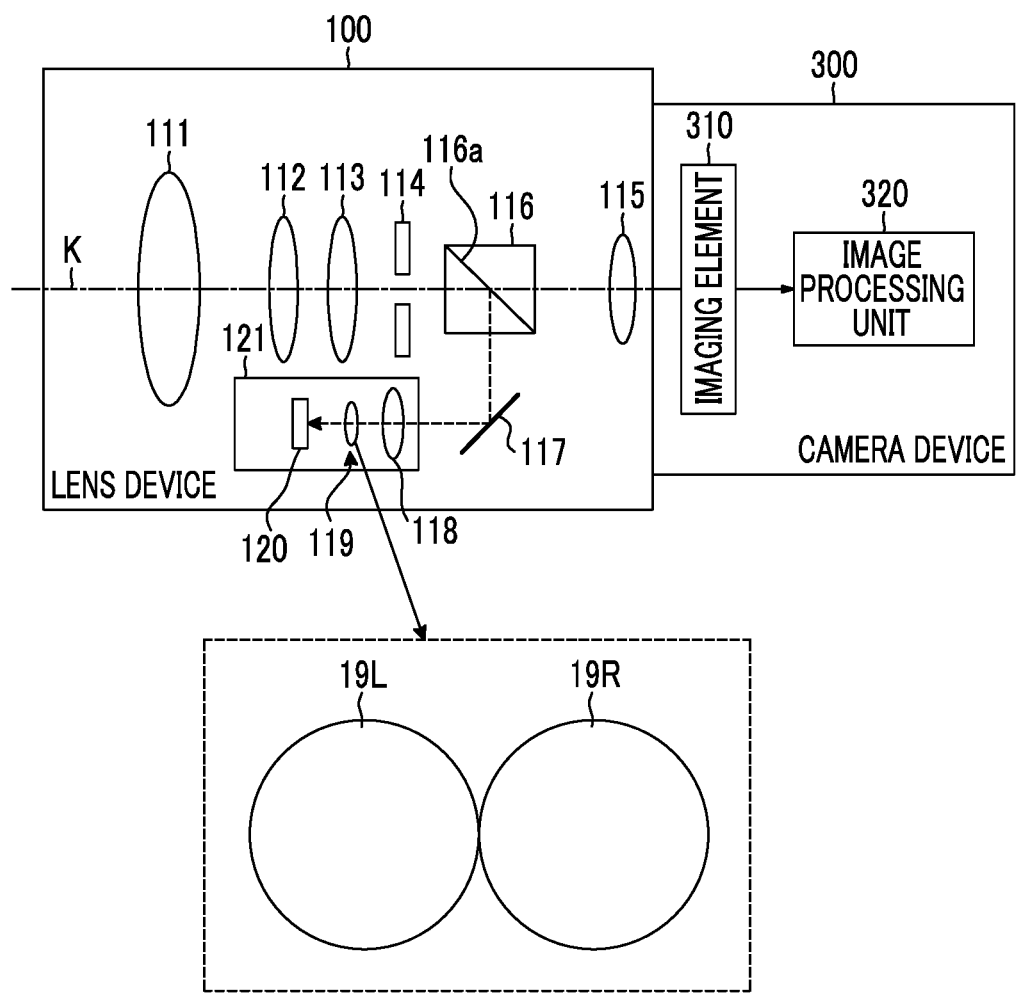
FIG. 29 is a diagram showing the schematic configuration of a camera system according to an embodiment of the invention.

FIG. 29 is a diagram showing the schematic configuration of a camera system according to an embodiment of the invention. The camera system is suitable for a camera system for business use, such as broadcasting or movie.

The camera system shown in FIG. 29 includes a lens device 100, and a camera device 300 as an imaging device in which the lens device 100 is mounted.

The lens device 100 includes a focus lens ill, zoom lenses 112 and 113, a diaphragm 114, and a master lens group 115, and these are arranged in this order from a subject side.

The focus lens 111, the zoom lenses 112 and 113, the diaphragm 114, and the master lens group 115 constitute an imaging optical system. The imaging optical system includes at least the focus lens 111.

The lens device 100 further includes a beam splitter 116 including a reflective surface 116a, a mirror 117, and an AF unit 121 including a condenser lens 118, a separator lens 119, and an imaging element 120. The imaging element 120 is an image sensor, such as a CCD image sensor or a CMOS image sensor, having a plurality of pixels arranged in a two-dimensional manner.

The beam splitter 116 is provided between the diaphragm 114 and the master lens group 115 on an optical axis K. The beam splitter 116 transmits a part (for example, 80% of subject light) of subject light entering the imaging optical system and passing through the diaphragm 114 as it is and reflects remaining light (for example, 20% of subject light) excluding the part of subject light in a direction orthogonal to the optical axis K on the reflective surface 116a. The position of the beam splitter 116 is not limited to that shown in FIG. 29, and may be provided at the back of a lens of the imaging optical system closest to the subject side on the optical axis K.

The mirror 117 is provided on an optical path of light reflected on the reflective surface 116a of the beam splitter 116, and reflects light and makes light enter the condenser lens 118 of the AF unit 121.

The condenser lens 118 condenses light reflected on the mirror 117.

As shown in an enlarged front view in a broken line of FIG. 29, the separator lens 119 is constituted of two lenses 19R and 19L arranged in one direction (in the example of FIG. 29, a horizontal direction) with the optical axis of the imaging optical system sandwiched therebetween.

Subject light condensed by the condenser lens 118 passes through the two lenses 19R and 19L, respectively, and forms images at different positions of the light receiving surface (a surface on which a plurality of pixels are provided) of the imaging element 120. That is, on the light receiving surface of the imaging element 120, a pair of subject light images deviated in one direction and a pair of subject light images deviated in a direction orthogonal to one direction are formed.

The beam splitter 116, the mirror 117, the condenser lens 118, and the separator lens 119 function as optical elements which make a part of subject light incident on the imaging optical system enter an imaging element 310 of the camera device 300 capturing a subject light image through the imaging optical system and make remaining light excluding the part of subject light enter the imaging element 120. A configuration may be made in which the mirror 117 is removed and light reflected on the beam splitter 116 is made directly enter the condenser lens 118.

The imaging element 120 is an area sensor in which a plurality of pixels are arranged in a two-dimensional manner on the light receiving surface, and outputs image signals according to the respective two subject light images formed on the light receiving surface. That is, the imaging element 120 outputs a pair of image signals deviated in the horizontal direction for one subject light image formed by the imaging optical system. An area sensor is used as the imaging element 120, whereby it is possible to avoid difficulty in accurately aligning the positions of line sensors compared to a configuration in which line sensors are used.

Each pixel which outputs one of a pair of image signals deviated in the horizontal direction among the pixels included in the imaging element 120 constitutes a first signal detection unit which receives one luminous flux of a pair of luminous fluxes passing through two different portions arranged in the horizontal direction of the pupil area of the imaging optical system and detects a signal according to the amount of received light.

Each pixel which outputs the other image signal of a pair of image signals deviated in the horizontal direction among the pixels included in the imaging element 120 constitutes a second signal detection unit which receives the other luminous flux of a pair of luminous fluxes passing through two different portions arranged in the horizontal direction of the pupil area of the imaging optical system and detects a signal according to the amount of received light.

Here, although the imaging element 120 is constituted as an area sensor, instead of the imaging element 120, a configuration may be made in which a line sensor having a plurality of pixels constituting the first signal detection units arranged in the horizontal direction is provided at a position facing the lens 19L and a line sensor having a plurality of pixels constituting the second signal detection units arranged in the horizontal direction is provided at a position facing the lens 19R.

The camera device 300 includes the imaging element 310, such as a CCD image sensor or a CMOS image sensor, which is provided on the optical axis K of the lens device 100, and an image processing unit 320 which processes an image signal obtained by capturing a subject light image with the imaging element 310 to generate captured image data.

The block configuration of the lens device 100 is the same as that of the lens device of FIG. 1, and includes a drive unit which drives the focus lens, and a system control unit which controls the drive unit. The system control unit executes the focusing control program, and functions as the phase difference calculation unit 11a, the phase difference prediction unit 11b, the lens drive control unit 11c, and the prediction error calculation unit 11d. However, the first signal group and the second signal group which are input to the system control unit are signals output from the first signal detection units and the second signal detection units of the imaging element 120. In this camera system, the system control unit of the lens device 100 functions as a focusing control device.

In a camera system for business use, moving image capturing is a basic way of using. For this reason, focusing control by the system control units 11 and 11A of the digital camera described referring to FIGS. 1 to 28 becomes particularly effective.

Figure 30:
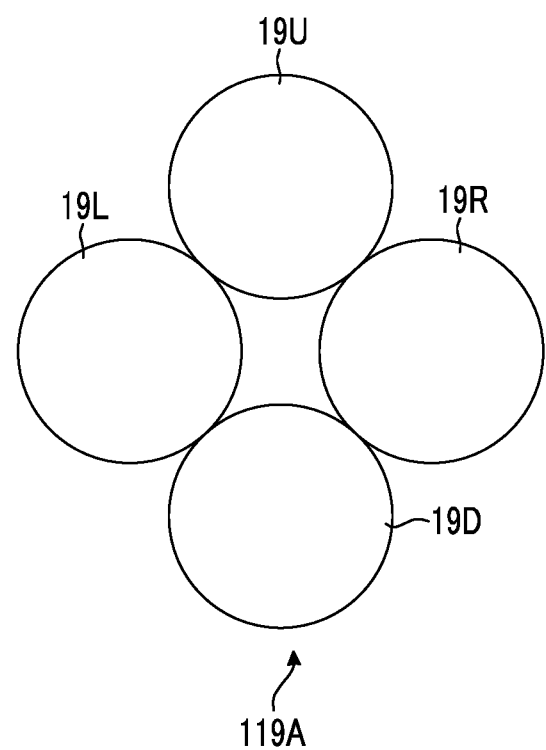
FIG. 30 is a diagram showing a modification example of the camera system of FIG. 29.

The separator lens 119 shown in FIG. 29 is changed to a separator lens 119A shown in FIG. 30, whereby it is possible to provide the imaging element 120 with the third signal detection units and the fourth signal detection units described referring to FIG. 24.

The separator lens 119A is constituted of two lenses 19R and 19L provided in one direction (in the example of FIG. 30, a horizontal direction) with the optical axis of the imaging optical system sandwiched therebetween, and two lenses 19U and 19D provided in a direction (in the example of FIG. 30, a vertical direction) orthogonal to one direction with the optical axis of the imaging optical system sandwiched therebetween.

As described above, the following matters are disclosed in this specification.

Disclosed is a focusing control device comprising a plurality of first signal detection units which receive one of a pair of luminous fluxes passing through different portions arranged in one direction of a pupil area of an imaging optical system including a focus lens and detect signals according to the amount of received light, a plurality of second signal detection units which receive the other luminous flux of the pair of luminous fluxes and detect signals according to the amount of received light, a phase difference calculation unit which, based on a result of correlation calculation of a first signal group output from the plurality of first signal detection units and a second signal group output from the plurality of second signal detection units, calculates a phase difference as a deviation amount between the first signal group and the second signal group in the one direction, a lens drive control unit which drives the focus lens according to a drive amount corresponding to a phase difference calculated by the phase difference calculation unit, a phase difference prediction unit which, based on a coefficient for converting, to a drive amount of the focus lens, a phase difference calculated by the phase difference calculation unit at a first time when the focus lens is at an arbitrary position and the difference between a movement amount of the focus lens from the arbitrary position at a second time after the focus lens starts to move according to a drive amount corresponding to the phase difference and the drive amount, calculates a predicted value of the phase difference at the second time, and a prediction error calculation unit which calculates a prediction error as an error between a phase difference calculated by the phase difference calculation unit at the second time and a predicted value calculated by the phase difference prediction unit. The lens drive control unit controls the drive of the focus lens based on a history of the prediction error.

In the disclosed focusing control device, the lens drive control unit drives the focus lens with a drive amount corresponding to a phase difference obtained through calculation using a phase difference calculated by the phase difference calculation unit and the prediction error calculated before a calculation time of the phase difference in a case where a state of the prediction error exceeding a first threshold value is continued with a frequency equal to or greater than a second threshold value, and drives the focus lens with a drive amount corresponding to a phase difference calculated by the phase difference calculation unit in a case where the frequency of continuation of the state is less than the second threshold value.

In the disclosed focusing control device, the lens drive control unit drives the focus lens with a drive amount corresponding to a phase difference obtained by adding or subtracting, to or from a phase difference calculated by the phase difference calculation unit, one prediction error or an average value of a plurality of prediction errors calculated before a calculation time of the phase difference in a case where a state of the prediction error exceeding the first threshold value is continued with a frequency equal to or greater than the second threshold value, and drives the focus lens with a drive amount corresponding to a phase difference calculated by the phase difference calculation unit in a case where the frequency of continuation of the state is less than the second threshold value.

In the disclosed focusing control device, the lens drive control unit permits the drive of the focus lens in a case where a state of the prediction error being less than a third threshold value is continued with a frequency equal to or greater than a fourth threshold value, and inhibits the drive of the focus lens in a case where the frequency of continuation of the state is less than the fourth threshold value.

In the disclosed focusing control device, the lens drive control unit permits the drive of the focus lens in a case where reliability of the result of the correlation calculation by the phase difference calculation unit becomes equal to or less than a fifth threshold value and a state of the prediction error being less than a sixth threshold value is continued with a frequency equal to or greater than a seventh threshold value, and inhibits the drive of the focus lens in a case where the reliability becomes equal to or less than the fifth threshold value and the frequency of continuation of the state is less than the seventh threshold value.

In the disclosed focusing control device, the prediction error is information indicating whether or not the signs of the phase difference and the predicted value are opposite, and the lens drive control unit inhibits the drive of the focus lens in a case where a state of the signs being opposite is continued with a frequency equal to or greater than an eighth threshold value, and permits the drive of the focus lens in a case where the frequency of continuation of the state is less than the eighth threshold value.

In the disclosed focusing control device, the phase difference calculation unit calculates the phase difference based on a result of the correlation calculation at an arbitrary time and a predicted value calculated by the phase difference prediction unit at the arbitrary time.

In the disclosed focusing control device, the result of the correlation calculation is data indicating change in a correlation value of the first signal group and the second signal group when the first signal group and the second signal group are deviated in the one direction, and the phase difference calculation unit calculates, as a phase difference, a value closest to the predicted value among deviation amounts in the one direction corresponding to trough portions of a graph indicating change in the correlation value at the arbitrary time.

In the disclosed focusing control device, the phase difference prediction unit calculates the predicted value by converting the difference to a phase difference using the coefficient.

Disclosed is a focusing control device comprising a plurality of first signal detection units which receive one of a first pair of luminous fluxes passing through different portions arranged in one direction of a pupil area of an imaging optical system including a focus lens and detect signals according to the amount of received light, a plurality of second signal detection units which receive the other luminous flux of the first pair of luminous fluxes and detect signals according to the amount of received light, a plurality of third signal detection units which receive one of a second pair of luminous fluxes passing through different portions arranged in a direction orthogonal to the one direction of the pupil area and detect signals according to the amount of received light, a plurality of fourth signal detection units which receive the other luminous flux of the second pair of luminous fluxes and detect signals according to the amount of received light, a first phase difference calculation unit which, based on a result of correlation calculation of a first signal group output from the plurality of first signal detection units and a second signal group output from the plurality of second signal detection units, calculates a first phase difference as a deviation amount between the first signal group and the second signal group in the one direction, a second phase difference calculation unit which, based on a result of correlation calculation of a third signal group output from the plurality of third signal detection units and a fourth signal group output from the plurality of fourth signal detection units, calculates a second phase difference as a deviation amount between the third signal group and the fourth signal group in the direction orthogonal to the one direction, a lens drive control unit which drives the focus lens according to a drive amount corresponding to a phase difference calculated by the first phase difference calculation unit or the second phase difference calculation unit, a phase difference prediction unit which, based on a coefficient for converting, to a drive amount of the focus lens, a phase difference calculated by the first phase difference calculation unit or the second phase difference calculation unit at a first time when the focus lens is at an arbitrary position and the difference between a movement amount of the focus lens from the arbitrary position at a second time after the focus lens starts to move according to a drive amount corresponding to the phase difference and the drive amount, calculates a predicted value of the phase difference at the second time, and a prediction error calculation unit which calculates a first prediction error as the difference between a predicted value calculated by the phase difference prediction unit and a phase difference calculated by the first phase difference calculation unit at the second time and a second prediction error as the difference between a predicted value calculated by the phase difference prediction unit and a phase difference calculated by the second phase difference calculation unit at the second time. The lens drive control unit drives the focus lens with a drive amount corresponding to a phase difference calculated by the first phase difference calculation unit in a case where both of the first phase difference and the second phase difference are calculated and a cumulative value of the first prediction error is equal to or less than a cumulative value of the second prediction error, and drives the focus lens with a drive amount corresponding to a phase difference calculated by the second phase difference calculation unit in a case where both of the first phase difference and the second phase difference are calculated and the cumulative value of the first prediction error exceeds the cumulative value of the second prediction error.

In the disclosed focusing control device, the first phase difference calculation unit calculates the first phase difference based on a result of the correlation calculation at an arbitrary time and a predicted value calculated by the phase difference prediction unit at the arbitrary time, and the second phase difference calculation unit calculates the second phase difference based on a result of the correlation calculation at an arbitrary time and a predicted value calculated by the phase difference prediction unit at the arbitrary time.

In the disclosed focusing control device, the result of the correlation calculation of the first signal group and the second signal group is data indicating change in a first correlation value of the first signal group and the second signal group when the first signal group and the second signal group are deviated in the one direction, the first phase difference calculation unit calculates, as the first phase difference, a value closest to the predicted value among deviation amounts in the one direction corresponding to trough portions of a graph indicating change in the first correlation value at the arbitrary time, the result of the correlation calculation of the third signal group and the fourth signal group is data indicating change in a second correlation value of the third signal group and the fourth signal group when the third signal group and the fourth signal group are deviated in the direction orthogonal to the one direction, and the second phase difference calculation unit calculates, as the second phase difference, a value closest to the predicted value among deviation amounts in the direction orthogonal to the one direction corresponding to trough portions of a graph indicating change in the second correlation value at the arbitrary time.

In the disclosed focusing control device, the phase difference prediction unit calculates the predicted value by converting the difference to a phase difference using the coefficient.

Disclosed is a lens device comprising the above-described focusing control device, and the above-described imaging optical system.

Disclosed is an imaging device comprising the above-described focusing control device.

Disclosed is a focusing control method which controls a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light. The focusing control method comprises a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction, a lens drive control step of driving the focus lens according to a drive amount corresponding to a phase difference calculated in the phase difference calculation step, a phase difference prediction step of, based on a coefficient for converting, to a drive amount of the focus lens, a phase difference calculated in the phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a prediction error as an error between a phase difference calculated in the phase difference calculation step at the second time and a predicted value calculated in the phase difference prediction step. In the lens drive control step, the drive of the focus lens is controlled based on a history of the prediction error.

In the disclosed focusing control method, in the lens drive control step, the focus lens is driven with a drive amount corresponding to a phase difference obtained through calculation using a phase difference calculated in the phase difference calculation step and the prediction error calculated before a calculation time of the phase difference in a case where a state of the prediction error exceeding a first threshold value is continued with a frequency equal to or greater than a second threshold value, and the focus lens is driven with a drive amount corresponding to a phase difference calculated in the phase difference calculation step in a case where the frequency of continuation of the state is less than the second threshold value.

In the disclosed focusing control method, in the lens drive control step, the focus lens is driven with a drive amount corresponding to a phase difference obtained by adding or subtracting, to or from a phase difference calculated in the phase difference calculation step, one prediction error or an average value of a plurality of prediction errors calculated before a calculation time of the phase difference in a case where a state of the prediction error exceeding the first threshold value is continued with a frequency equal to or greater than the second threshold value, and the focus lens is driven with a drive amount corresponding to a phase difference calculated in the phase difference calculation step in a case where the frequency of continuation of the state is less than the second threshold value.

In the disclosed focusing control method, in the lens drive control step, the drive of the focus lens is permitted in a case where a state of the prediction error being less than a third threshold value is continued with a frequency equal to or greater than a fourth threshold value, and the drive of the focus lens is inhibited in a case where the frequency of continuation of the state is less than the fourth threshold value.

In the disclosed focusing control method, in the lens drive control step, the drive of the focus lens is permitted in a case where reliability of the result of the correlation calculation in the phase difference calculation step becomes equal to or less than a fifth threshold value and a state of the prediction error being less than a sixth threshold value is continued with a frequency equal to or greater than a seventh threshold value, and the drive of the focus lens is inhibited in a case where the reliability becomes equal to or less than the fifth threshold value and the frequency of continuation of the state is less than the seventh threshold value.

In the disclosed focusing control method, the prediction error includes information indicating whether or not the signs of the phase difference and the predicted value are opposite, and in the lens drive control step, the drive of the focus lens is inhibited in a case where a state of the signs being opposite is continued with a frequency equal to or greater than an eighth threshold value, and the drive of the focus lens is permitted in a case where the frequency of continuation of the state is less than the eighth threshold value.

In the disclosed focusing control method, In the phase difference calculation step, the phase difference is calculated based on a result of the correlation calculation at an arbitrary time and a predicted value calculated by the phase difference prediction step at the arbitrary time.

In the disclosed focusing control method, the result of the correlation calculation is data indicating change in a correlation value of the first signal group and the second signal group when the first signal group and the second signal group are deviated in the one direction, and in the phase difference calculation step, a value closest to the predicted value among deviation amounts in the one direction corresponding to trough portions of a graph indicating change in the correlation value at the arbitrary time is calculated as a phase difference.

In the disclosed focusing control method, in the phase difference prediction step, the predicted value is calculated by converting the difference to a phase difference using the coefficient.

Disclosed is a focusing control method which controls a position of a focus lens using a plurality of first signal detection units configured to receive one of a first pair of luminous fluxes passing through different portions arranged in one direction of a pupil area of an imaging optical system including a focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light. The focusing control method comprises a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction, a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction, a lens drive control step of driving the focus lens according to a drive amount corresponding to a phase difference calculated by the first phase difference calculation step or the second phase difference calculation step, a phase difference prediction step of, based on a coefficient for converting, to a drive amount of the focus lens, a phase difference calculated in the first phase difference calculation step or the second phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a first prediction error as the difference between a predicted value calculated in the phase difference prediction step and a phase difference calculated in the first phase difference calculation step at the second time and a second prediction error as the difference between a predicted value calculated in the phase difference prediction step and a phase difference calculated in the second phase difference calculation step at the second time. In the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

In the disclosed focusing control method, in the first phase difference calculation step, the first phase difference is calculated based on a result of the correlation calculation at an arbitrary time and a predicted value calculated in the phase difference prediction step at the arbitrary time, and in the second phase difference calculation step, the second phase difference is calculated based on a result of the correlation calculation at an arbitrary time and a predicted value calculated in the phase difference prediction step at the arbitrary time.

In the disclosed focusing control method, the result of the correlation calculation of the first signal group and the second signal group is data indicating change in a first correlation value of the first signal group and the second signal group when the first signal group and the second signal group are deviated in the one direction, in the first phase difference calculation step, a value closest to the predicted value among deviation amounts in the one direction corresponding to trough portions of a graph indicating change in the first correlation value at the arbitrary time is calculated as the first phase difference, the result of the correlation calculation of the third signal group and the fourth signal group is data indicating change in a second correlation value of the third signal group and the fourth signal group when the third signal group and the fourth signal group are deviated in the direction orthogonal to the one direction, and in the second phase difference calculation step, a value closest to the predicted value among deviation amounts in the direction orthogonal to the one direction corresponding to trough portions of a graph indicating change in the second correlation value at the arbitrary time is calculated as the second phase difference.

In the disclosed focusing control method, in the phase difference prediction step, the predicted value is calculated by converting the difference to a phase difference using the coefficient.

Disclosed is a non-transitory computer readable recording medium storing a focusing control program which causes a computer to control a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light. The non-transitory computer readable recording medium storing the focusing control program comprises a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction, a lens drive control step of driving the focus lens according to a drive amount corresponding to a phase difference calculated in the phase difference calculation step, a phase difference prediction step of, based on a coefficient for converting, to a drive amount of the focus lens, a phase difference calculated in the phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a prediction error as an error between a phase difference calculated in the phase difference calculation step at the second time and a predicted value calculated in the phase difference prediction step. In the lens drive control step, the drive of the focus lens is controlled based on a history of the prediction error.

Disclosed is a non-transitory computer readable recording medium storing a focusing control program which causes a computer to control a position of a focus lens using a plurality of first signal detection units configured to receive one of a first pair of luminous fluxes passing through different portions arranged in one direction of a pupil area of an imaging optical system including the focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light. The non-transitory computer readable recording medium storing the focusing control program comprises a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction, a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction, a lens drive control step of driving the focus lens according to a drive amount corresponding to a phase difference calculated by the first phase difference calculation step or the second phase difference calculation step, a phase difference prediction step of, based on a coefficient for converting, to a drive amount of the focus lens, a phase difference calculated in the first phase difference calculation step or the second phase difference calculation step at a first time when the focus lens is at an arbitrary position and the difference between a movement amount of the focus lens from the arbitrary position at a second time after the focus lens starts to move according to a drive amount corresponding to the phase difference and the drive amount, calculating a predicted value of the phase difference at the second time, and a prediction error calculation step of calculating a first prediction error as the difference between a predicted value calculated in the phase difference prediction step and a phase difference calculated in the first phase difference calculation step at the second time and a second prediction error as the difference between a predicted value calculated in the phase difference prediction step and a phase difference calculated in the second phase difference calculation step at the second time. In the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

The invention is applied to, in particular, a television camera for broadcasting or the like primarily involved in moving image capturing, thereby achieving high convenience and effectiveness.

EXPLANATION OF REFERENCES

1: imaging lens
5: imaging element
52A, 52B: phase difference detection pixel
11: system control unit
11a: phase difference calculation unit
11b: phase difference prediction unit
11c: lens drive control unit
11d: prediction error calculation unit

What is claimed is:

1. A focusing control device comprising:
a plurality of first signal detection units which receive one of a pair of luminous fluxes passing through different portions arranged in one direction of a pupil area of an imaging optical system including a focus lens and detect signals according to the amount of received light;
a plurality of second signal detection units which receive the other luminous flux of the pair of luminous fluxes and detect signals according to the amount of received light;
a phase difference calculation unit which, based on a result of correlation calculation of a first signal group output from the plurality of first signal detection units and a second signal group output from the plurality of second signal detection units, calculates a phase difference as a deviation amount between the first signal group and the second signal group in the one direction;
a lens drive control unit which drives the focus lens according to a drive amount corresponding to a phase difference calculated by the phase difference calculation unit;
a phase difference prediction unit which, based on a coefficient for converting, to a drive amount of the focus lens, a phase difference calculated by the phase difference calculation unit at a first time when the focus lens is at an arbitrary position and a difference between a movement amount of the focus lens from the arbitrary position at a second time after the focus lens starts to move according to a drive amount corresponding to the phase difference and the drive amount, calculates a predicted value of the phase difference at the second time; and
a prediction error calculation unit which calculates a prediction error as an error between a phase difference calculated by the phase difference calculation unit at the second time and a predicted value calculated by the phase difference prediction unit,
wherein the lens drive control unit controls the drive of the focus lens based on a history of the prediction error.

2. The focusing control device according to claim 1,
wherein the lens drive control unit drives the focus lens with a drive amount corresponding to a phase difference obtained through calculation using a phase difference calculated by the phase difference calculation unit and the prediction error calculated before a calculation time of the phase difference in a case where a state of the prediction error exceeding a first threshold value is continued with a frequency equal to or greater than a second threshold value, and drives the focus lens with a drive amount corresponding to a phase difference calculated by the phase difference calculation unit in a case where the frequency of continuation of the state is less than the second threshold value.

3. The focusing control device according to claim 2,
wherein the lens drive control unit drives the focus lens with a drive amount corresponding to a phase difference obtained by adding or subtracting, to or from a phase difference calculated by the phase difference calculation unit, one prediction error or an average value of a plurality of prediction errors calculated before a calculation time of the phase difference in a case where a state of the prediction error exceeding the first threshold value is continued with a frequency equal to or greater than the second threshold value.

4. The focusing control device according to claim 1,
wherein the lens drive control unit permits the drive of the focus lens in a case where a state of the prediction error being less than a third threshold value is continued with a frequency equal to or greater than a fourth threshold value, and inhibits the drive of the focus lens in a case where the frequency of continuation of the state is less than the fourth threshold value.

5. The focusing control device according to claim 1, wherein the lens drive control unit permits the drive of the focus lens in a case where reliability of the result of the correlation calculation by the phase difference calculation unit becomes equal to or less than a fifth threshold value and a state of the prediction error being less than a sixth threshold value is continued with a frequency equal to or greater than a seventh threshold value, and inhibits the drive of the focus lens in a case where the reliability becomes equal to or less than the fifth threshold value and the frequency of continuation of the state is less than the seventh threshold value.

6. The focusing control device according to claim 1, wherein the prediction error is information indicating whether or not the signs of the phase difference and the predicted value are opposite, and
the lens drive control unit inhibits the drive of the focus lens in a case where a state of the signs being opposite is continued with a frequency equal to or greater than an eighth threshold value, and permits the drive of the focus lens in a case where the frequency of continuation of the state is less than the eighth threshold value.

7. The focusing control device according to claim 1, wherein the phase difference calculation unit calculates the phase difference based on a result of the correlation calculation at an arbitrary time and a predicted value calculated by the phase difference prediction unit at the arbitrary time.

8. The focusing control device according to claim 7, wherein the result of the correlation calculation is data indicating change in a correlation value of the first signal group and the second signal group when the first signal group and the second signal group are deviated in the one direction, and
the phase difference calculation unit calculates, as a phase difference, a value closest to the predicted value among deviation amounts in the one direction corresponding to trough portions of a graph indicating change in the correlation value at the arbitrary time.

9. The focusing control device according to claim 1, wherein the phase difference prediction unit calculates the predicted value by converting the difference to a phase difference using the coefficient.

10. A focusing control device comprising:
a plurality of first signal detection units which receive one of a first pair of luminous fluxes passing through different portions arranged in one direction of a pupil area of an imaging optical system including a focus lens and detect signals according to the amount of received light;
a plurality of second signal detection units which receive the other luminous flux of the first pair of luminous fluxes and detect signals according to the amount of received light;
a plurality of third signal detection units which receive one of a second pair of luminous fluxes passing through different portions arranged in a direction orthogonal to the one direction of the pupil area and detect signals according to the amount of received light;
a plurality of fourth signal detection units which receive the other luminous flux of the second pair of luminous fluxes and detect signals according to the amount of received light;
a first phase difference calculation unit which, based on a result of correlation calculation of a first signal group output from the plurality of first signal detection units and a second signal group output from the plurality of second signal detection units, calculates a first phase difference as a deviation amount between the first signal group and the second signal group in the one direction;
a second phase difference calculation unit which, based on a result of correlation calculation of a third signal group output from the plurality of third signal detection units and a fourth signal group output from the plurality of fourth signal detection units, calculates a second phase difference as a deviation amount between the third signal group and the fourth signal group in the direction orthogonal to the one direction;
a lens drive control unit which drives the focus lens according to a drive amount corresponding to a phase difference calculated by the first phase difference calculation unit or the second phase difference calculation unit;
a phase difference prediction unit which, based on a coefficient for converting, to a drive amount of the focus lens, a phase difference calculated by the first phase difference calculation unit or the second phase difference calculation unit at a first time when the focus lens is at an arbitrary position and a difference between a movement amount of the focus lens from the arbitrary position at a second time after the focus lens starts to move according to a drive amount corresponding to the phase difference and the drive amount, calculates a predicted value of the phase difference at the second time; and
a prediction error calculation unit which calculates a first prediction error as a difference between a predicted value calculated by the phase difference prediction unit and a phase difference calculated by the first phase difference calculation unit at the second time and a second prediction error as a difference between a predicted value calculated by the phase difference prediction unit and a phase difference calculated by the second phase difference calculation unit at the second time,
wherein the lens drive control unit drives the focus lens with a drive amount corresponding to a phase difference calculated by the first phase difference calculation unit in a case where both of the first phase difference and the second phase difference are calculated and a cumulative value of the first prediction error is equal to or less than a cumulative value of the second prediction error, and drives the focus lens with a drive amount corresponding to a phase difference calculated by the second phase difference calculation unit in a case where both of the first phase difference and the second phase difference are calculated and the cumulative value of the first prediction error exceeds the cumulative value of the second prediction error.

11. The focusing control device according to claim 10, wherein the first phase difference calculation unit calculates the first phase difference based on a result of the correlation calculation at an arbitrary time and a predicted value calculated by the phase difference prediction unit at the arbitrary time, and
the second phase difference calculation unit calculates the second phase difference based on a result of the correlation calculation at an arbitrary time and a predicted value calculated by the phase difference prediction unit at the arbitrary time.

12. The focusing control device according to claim 11,
wherein the result of the correlation calculation of the first signal group and the second signal group is data indicating change in a first correlation value of the first signal group and the second signal group when the first signal group and the second signal group are deviated in the one direction,
the first phase difference calculation unit calculates, as the first phase difference, a value closest to the predicted value among deviation amounts in the one direction corresponding to trough portions of a graph indicating change in the first correlation value at the arbitrary time,
the result of the correlation calculation of the third signal group and the fourth signal group is data indicating change in a second correlation value of the third signal group and the fourth signal group when the third signal group and the fourth signal group are deviated in the direction orthogonal to the one direction, and
the second phase difference calculation unit calculates, as the second phase difference, a value closest to the predicted value among deviation amounts in the direction orthogonal to the one direction corresponding to trough portions of a graph indicating change in the second correlation value at the arbitrary time.

13. The focusing control device according to claim 10,
wherein the phase difference prediction unit calculates the predicted value by converting the difference between the movement amount of the focus lens from the arbitrary position at the second time after the focus lens starts to move according to the drive amount corresponding to the phase difference and the drive amount to a phase difference using the coefficient.

14. A lens device comprising:
the focusing control device according to claim 1; and
the imaging optical system.

15. An imaging device comprising:
the focusing control device according to claim 1.

16. A focusing control method which controls a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light, the focusing control method comprising:
a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction;
a lens drive control step of driving the focus lens according to a drive amount corresponding to a phase difference calculated in the phase difference calculation step;
a phase difference prediction step of, based on a coefficient for converting, to a drive amount of the focus lens, a phase difference calculated in the phase difference calculation step at a first time when the focus lens is at an arbitrary position and a difference between a movement amount of the focus lens from the arbitrary position at a second time after the focus lens starts to move according to a drive amount corresponding to the phase difference and the drive amount, calculating a predicted value of the phase difference at the second time; and
a prediction error calculation step of calculating a prediction error as an error between a phase difference calculated in the phase difference calculation step at the second time and a predicted value calculated in the phase difference prediction step,
wherein, in the lens drive control step, the drive of the focus lens is controlled based on a history of the prediction error.

17. The focusing control method according to claim 16,
wherein, in the lens drive control step, the focus lens is driven with a drive amount corresponding to a phase difference obtained through calculation using a phase difference calculated in the phase difference calculation step and the prediction error calculated before a calculation time of the phase difference in a case where a state of the prediction error exceeding a first threshold value is continued with a frequency equal to or greater than a second threshold value, and the focus lens is driven with a drive amount corresponding to a phase difference calculated in the phase difference calculation step in a case where the frequency of continuation of the state is less than the second threshold value.

18. The focusing control method according to claim 17,
wherein, in the lens drive control step, the focus lens is driven with a drive amount corresponding to a phase difference obtained by adding or subtracting, to or from a phase difference calculated in the phase difference calculation step, one prediction error or an average value of a plurality of prediction errors calculated before a calculation time of the phase difference in a case where a state of the prediction error exceeding the first threshold value is continued with a frequency equal to or greater than the second threshold value.

19. The focusing control method according to claim 17,
wherein, in the lens drive control step, the drive of the focus lens is permitted in a case where a state of the prediction error being less than a third threshold value is continued with a frequency equal to or greater than a fourth threshold value, and the drive of the focus lens is inhibited in a case where the frequency of continuation of the state is less than the fourth threshold value.

20. The focusing control method according to claim 17,
wherein, in the lens drive control step, the drive of the focus lens is permitted in a case where reliability of the result of the correlation calculation in the phase difference calculation step becomes equal to or less than a fifth threshold value and a state of the prediction error being less than a sixth threshold value is continued with a frequency equal to or greater than a seventh threshold value, and the drive of the focus lens is inhibited in a case where the reliability becomes equal to or less than the fifth threshold value and the frequency of continuation of the state is less than the seventh threshold value.

21. The focusing control method according to claim 17,
wherein the prediction error includes information indicating whether or not the signs of the phase difference and the predicted value are opposite, and
in the lens drive control step, the drive of the focus lens is inhibited in a case where a state of the signs being opposite is continued with a frequency equal to or greater than an eighth threshold value, and the drive of the focus lens is permitted in a case where the frequency of continuation of the state is less than the eighth threshold value.

22. The focusing control method according to claim 17, wherein, in the phase difference calculation step, the phase difference is calculated based on a result of the correlation calculation at an arbitrary time and a predicted value calculated by the phase difference prediction step at the arbitrary time.

23. The focusing control method according to claim 22, wherein the result of the correlation calculation is data indicating change in a correlation value of the first signal group and the second signal group when the first signal group and the second signal group are deviated in the one direction, and in the phase difference calculation step, a value closest to the predicted value among deviation amounts in the one direction corresponding to trough portions of a graph indicating change in the correlation value at the arbitrary time is calculated as a phase difference.

24. The focusing control method according to claim 17, wherein, in the phase difference prediction step, the predicted value is calculated by converting the difference to a phase difference using the coefficient.

25. A focusing control method which controls a position of a focus lens using a plurality of first signal detection units configured to receive one of a first pair of luminous fluxes passing through different portions arranged in one direction of a pupil area of an imaging optical system including a focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light, the focusing control method comprising:

a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction;

a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction;

a lens drive control step of driving the focus lens according to a drive amount corresponding to a phase difference calculated by the first phase difference calculation step or the second phase difference calculation step;

a phase difference prediction step of, based on a coefficient for converting, to a drive amount of the focus lens, a phase difference calculated in the first phase difference calculation step or the second phase difference calculation step at a first time when the focus lens is at an arbitrary position and a difference between a movement amount of the focus lens from the arbitrary position at a second time after the focus lens starts to move according to a drive amount corresponding to the phase difference and the drive amount, calculating a predicted value of the phase difference at the second time; and a prediction error calculation step of calculating a first prediction error as a difference between a predicted value calculated in the phase difference prediction step and a phase difference calculated in the first phase difference calculation step at the second time and a second prediction error as a difference between a predicted value calculated in the phase difference prediction step and a phase difference calculated in the second phase difference calculation step at the second time, wherein, in the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

26. The focusing control method according to claim 25, wherein, in the first phase difference calculation step, the first phase difference is calculated based on a result of the correlation calculation at an arbitrary time and a predicted value calculated in the phase difference prediction step at the arbitrary time, and in the second phase difference calculation step, the second phase difference is calculated based on a result of the correlation calculation at an arbitrary time and a predicted value calculated in the phase difference prediction step at the arbitrary time.

27. The focusing control method according to claim 26, wherein the result of the correlation calculation of the first signal group and the second signal group is data indicating change in a first correlation value of the first signal group and the second signal group when the first signal group and the second signal group are deviated in the one direction, in the first phase difference calculation step, a value closest to the predicted value among deviation amounts in the one direction corresponding to trough portions of a graph indicating change in the first correlation value at the arbitrary time is calculated as the first phase difference, the result of the correlation calculation of the third signal group and the fourth signal group is data indicating change in a second correlation value of the third signal group and the fourth signal group when the third signal group and the fourth signal group are deviated in the direction orthogonal to the one direction, and in the second phase difference calculation step, a value closest to the predicted value among deviation amounts in the direction orthogonal to the one direction corresponding to trough portions of a graph indicating change in the second correlation value at the arbitrary time is calculated as the second phase difference.

28. The focusing control method according to claim 25, wherein, in the phase difference prediction step, the predicted value is calculated by converting the difference between the movement amount of the focus lens from the arbitrary position at the second time after the focus lens starts to move according to the drive amount corresponding to the phase difference and the drive amount to a phase difference using the coefficient.

29. A non-transitory computer readable recording medium storing a focusing control program which causes a computer to control a position of a focus lens using a plurality of first signal detection units configured to receive one of a pair of luminous fluxes passing through different portions arranged in one direction of a pupil area of an imaging optical system including the focus lens and detect signals according to the amount of received light, and a plurality of second signal detection units configured to receive the other luminous flux of the pair of luminous fluxes and detect signals according to the amount of received light, the non-transitory computer readable recording medium storing the focusing control program comprising:

a phase difference calculation step of, based on a result of correlation calculation of a first signal group output from the plurality of first signal detection units and a second signal group output from the plurality of the second signal detection units, calculating a phase difference as a deviation amount between the first signal group and the second signal group in the one direction;

a lens drive control step of driving the focus lens according to a drive amount corresponding to a phase difference calculated in the phase difference calculation step;

a phase difference prediction step of, based on a coefficient for converting, to a drive amount of the focus lens, a phase difference calculated in the phase difference calculation step at a first time when the focus lens is at an arbitrary position and a difference between a movement amount of the focus lens from the arbitrary position at a second time after the focus lens starts to move according to a drive amount corresponding to the phase difference and the drive amount, calculating a predicted value of the phase difference at the second time; and a prediction error calculation step of calculating a prediction error as an error between a phase difference calculated in the phase difference calculation step at the second time and a predicted value calculated in the phase difference prediction step, wherein, in the lens drive control step, the drive of the focus lens is controlled based on a history of the prediction error.

30. A non-transitory computer readable recording medium storing a focusing control program which causes a computer to control a position of a focus lens using a plurality of first signal detection units configured to receive one of a first pair of luminous fluxes passing through different portions arranged in one direction of a pupil area of an imaging optical system including the focus lens and detect signals according to the amount of received light, a plurality of second signal detection units configured to receive the other luminous flux of the first pair of luminous fluxes and detect signals according to the amount of received light, a plurality of third signal detection units configured to receive one of a second pair of luminous fluxes passing through different portions arranged in a direction orthogonal to the one direction of the pupil area and detect signals according to the amount of received light, and a plurality of fourth signal detection units configured to receive the other luminous flux of the second pair of luminous fluxes and detect signals according to the amount of received light, the non-transitory computer readable recording medium storing the focusing control program comprising:

a first phase difference calculation step of, based on a result of correlation calculation of a first signal group output from the plurality of first signal detection units and a second signal group output from the plurality of second signal detection units, calculating a first phase difference as a deviation amount between the first signal group and the second signal group in the one direction;

a second phase difference calculation step of, based on a result of correlation calculation of a third signal group output from the plurality of third signal detection units and a fourth signal group output from the plurality of fourth signal detection units, calculating a second phase difference as a deviation amount between the third signal group and the fourth signal group in the direction orthogonal to the one direction;

a lens drive control step of driving the focus lens according to a drive amount corresponding to a phase difference calculated by the first phase difference calculation step or the second phase difference calculation step;

a phase difference prediction step of, based on a coefficient for converting, to a drive amount of the focus lens, a phase difference calculated in the first phase difference calculation step or the second phase difference calculation step at a first time when the focus lens is at an arbitrary position and a difference between a movement amount of the focus lens from the arbitrary position at a second time after the focus lens starts to move according to a drive amount corresponding to the phase difference and the drive amount, calculating a predicted value of the phase difference at the second time; and a prediction error calculation step of calculating a first prediction error as a difference between a predicted value calculated in the phase difference prediction step and a phase difference calculated in the first phase difference calculation step at the second time and a second prediction error as a difference between a predicted value calculated in the phase difference prediction step and a phase difference calculated in the second phase difference calculation step at the second time, wherein, in the lens drive control step, the focus lens is driven with a drive amount corresponding to a phase difference calculated in the first phase difference calculation step in a case where both of the first phase difference and the second phase difference are calculated and a cumulative value of the first prediction error is equal to or less than a cumulative value of the second prediction error, and the focus lens is driven with a drive amount corresponding to a phase difference calculated in the second phase difference calculation step in a case where both of the first phase difference and the second phase difference are calculated and the cumulative value of the first prediction error exceeds the cumulative value of the second prediction error.

* * * * *